US006454509B1

(12) United States Patent
Kappel et al.

(10) Patent No.: US 6,454,509 B1
(45) Date of Patent: Sep. 24, 2002

(54) MECHANICALLY ACTUATED PICKER FOR DATA STORAGE LIBRARY

(75) Inventors: Glendon D. Kappel, Eagan; Warren D. Pannkuk, Lakeville; Darren A. Groth, Fridley; Robert J. McPherson, Eden Prairie; Daniel R. Evanson, Prior Lake, all of MN (US)

(73) Assignee: Plasmon IDE, Inc., Eden Prairie, MN (US)

( * ) Notice: Subject to any disclaimer, the term of this patent is extended or adjusted under 35 U.S.C. 154(b) by 0 days.

(21) Appl. No.: 09/544,364

(22) Filed: Apr. 6, 2000

(51) Int. Cl.[7] ................................. G11B 17/04
(52) U.S. Cl. ...................... 414/280; 360/92; 369/30.43
(58) Field of Search ..................... 414/280; 369/30.43, 369/36.01, 17.01; 360/92

(56) References Cited

U.S. PATENT DOCUMENTS

| 4,614,474 A | 9/1986 | Sudo |
| 4,827,463 A | 5/1989 | Motoyoshi et al. |
| 4,853,916 A | 8/1989 | Tomita |
| 4,878,137 A | 10/1989 | Yamashita et al. |
| 4,918,548 A | 4/1990 | O'Donnell et al. |
| 4,972,277 A * | 11/1990 | Sills et al. .................... 360/92 |
| 4,998,232 A | 3/1991 | Methlie et al. |
| 5,014,255 A | 5/1991 | Wanger et al. |
| 5,036,503 A | 7/1991 | Tomita |
| 5,043,962 A | 8/1991 | Wanger et al. |
| 5,065,379 A | 11/1991 | Smith et al. |
| 5,123,000 A | 6/1992 | Fitzgerald et al. |
| 5,128,912 A | 7/1992 | Hug et al. |
| 5,220,548 A | 6/1993 | Nakasukasa et al. |
| 5,274,619 A | 12/1993 | Suzuki |
| 5,471,561 A | 11/1995 | Cowgill et al. |
| 5,487,579 A | 1/1996 | Woodruff |
| 5,517,473 A | 5/1996 | Permut |
| 5,602,821 A | 2/1997 | McPherson et al. |
| 5,607,275 A | 3/1997 | Woodruff et al. |
| 5,659,434 A * | 8/1997 | Yamakawa et al. ....... 360/92 X |
| 5,680,377 A | 10/1997 | Dang et al. |
| 5,894,469 A * | 4/1999 | Usami et al. ................ 369/192 |
| 5,898,593 A | 4/1999 | Baca et al. |

(List continued on next page.)

FOREIGN PATENT DOCUMENTS

EP 407305 1/1991

*Primary Examiner*—Steven A. Bratlie
(74) *Attorney, Agent, or Firm*—Gerald E. Helget; Nelson R. Capes; Briggs and Morgan

(57) ABSTRACT

An apparatus for picking and placing media supported in stores and drives of a data storage library without electrical actuation or separate mechanical actuation means of grasping and releasing the media's pick feature, the apparatus including: a carriage movable toward and away from the media, the media being supported in the stores and drives; at least one picker member pivotally attached to the carriage at a pivot point and having a latching portion adapted to engage the media's pick feature. The picker member is movable between an open state wherein the latching portion is spaced from the media's pick feature and a closed state wherein the latching portion engages the media's pick feature. The apparatus also includes a spring having a first end attached to the carriage and a second end attached to the picker member. The spring is alternately orientable between a first orientation wherein the spring biases the picker member toward the media and a second orientation wherein the spring biases the picker member away from the media. The movement of the picker member between the open state and the closed state and between the closed state and the open state is caused by movement of the picker member against the media supported in the stores and drives without any electrical or separate mechanical actuation means cooperating with the picker member.

25 Claims, 28 Drawing Sheets

U.S. PATENT DOCUMENTS

| | | |
|---|---|---|
| 5,940,361 A | 8/1999 | Proctor |
| 5,966,366 A * | 10/1999 | Pollard ........................ 369/178 |
| 5,970,030 A | 10/1999 | Dimitri et al. |
| 5,975,450 A | 11/1999 | Leger et al. |
| 5,999,356 A | 12/1999 | Dimitri et al. |
| 6,027,296 A | 2/2000 | Meier |
| 6,064,544 A | 5/2000 | Wada |
| 6,141,178 A * | 10/2000 | Nakajima et al. ............. 360/92 |
| 6,175,466 B1 | 1/2001 | Hori et al. |
| 6,233,111 B1 | 5/2001 | Schneider et al. |
| 6,266,316 B1 * | 7/2001 | Luffel et al. ................ 369/178 |
| 6,301,218 B1 | 10/2001 | Jones |
| 6,330,217 B1 | 12/2001 | Paul et al. |

\* cited by examiner

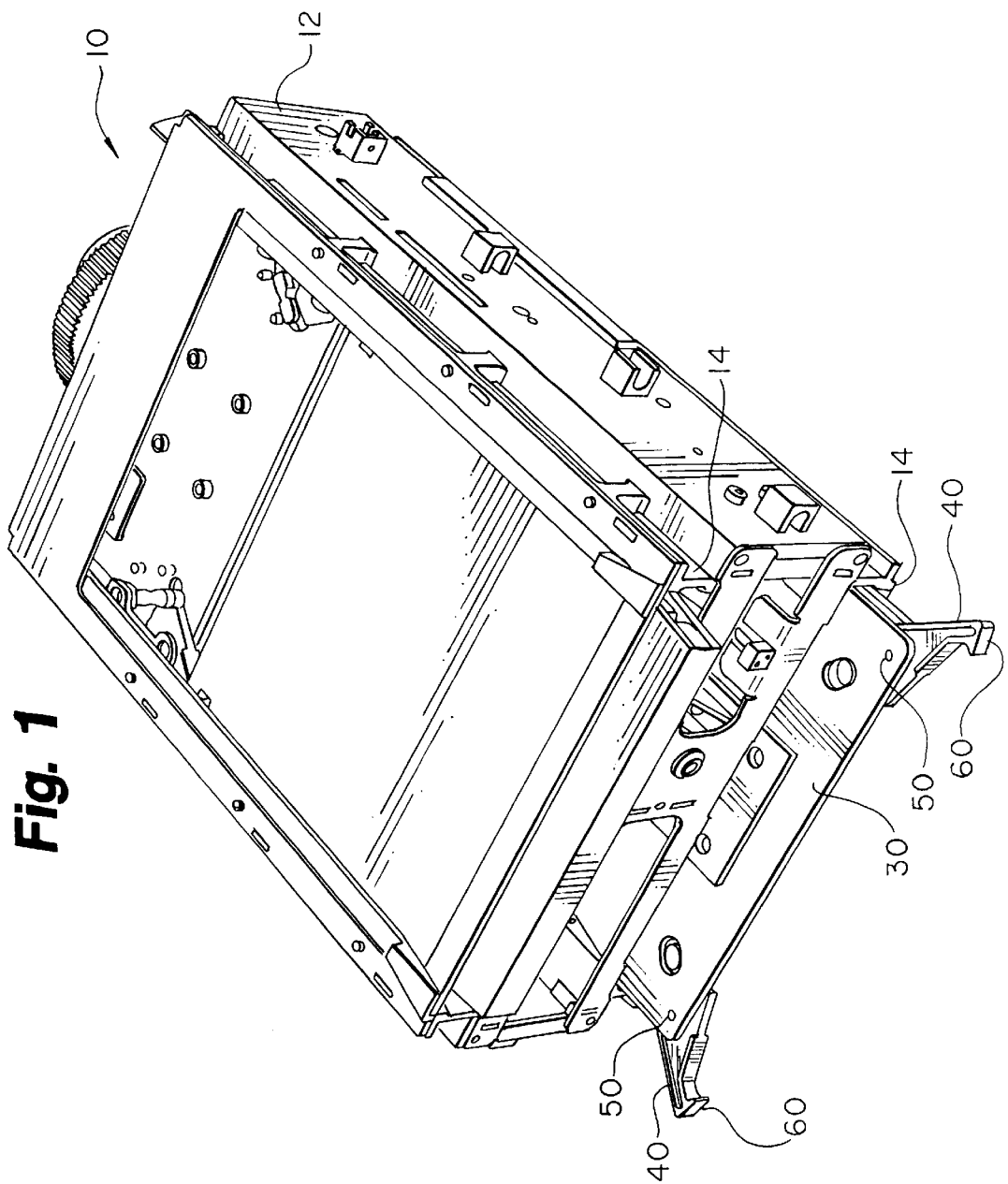

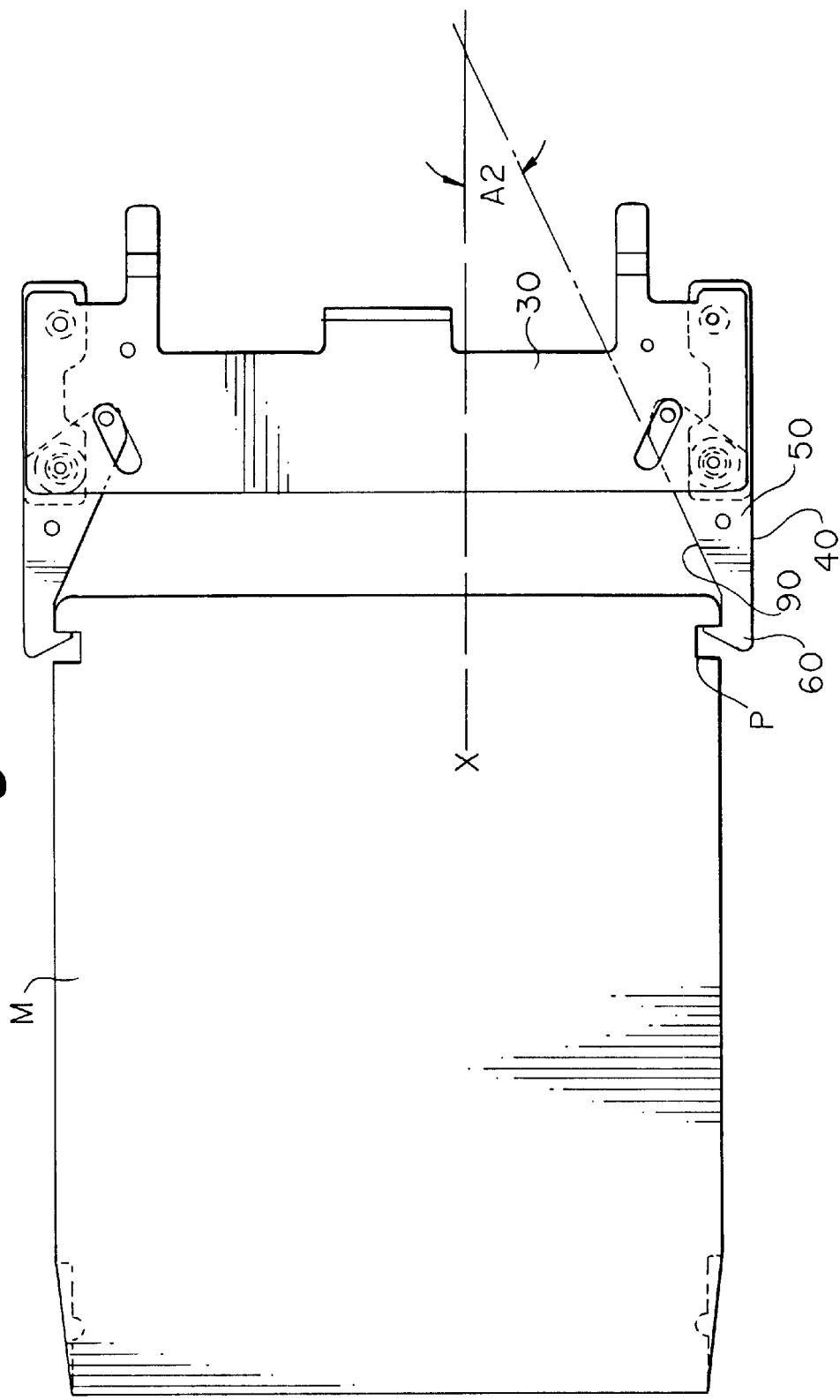

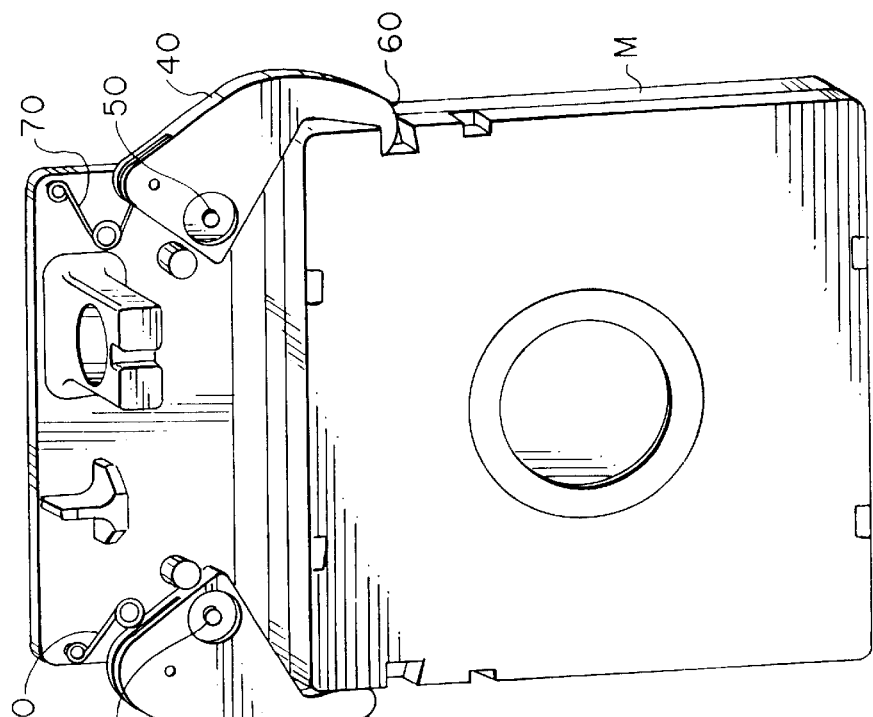
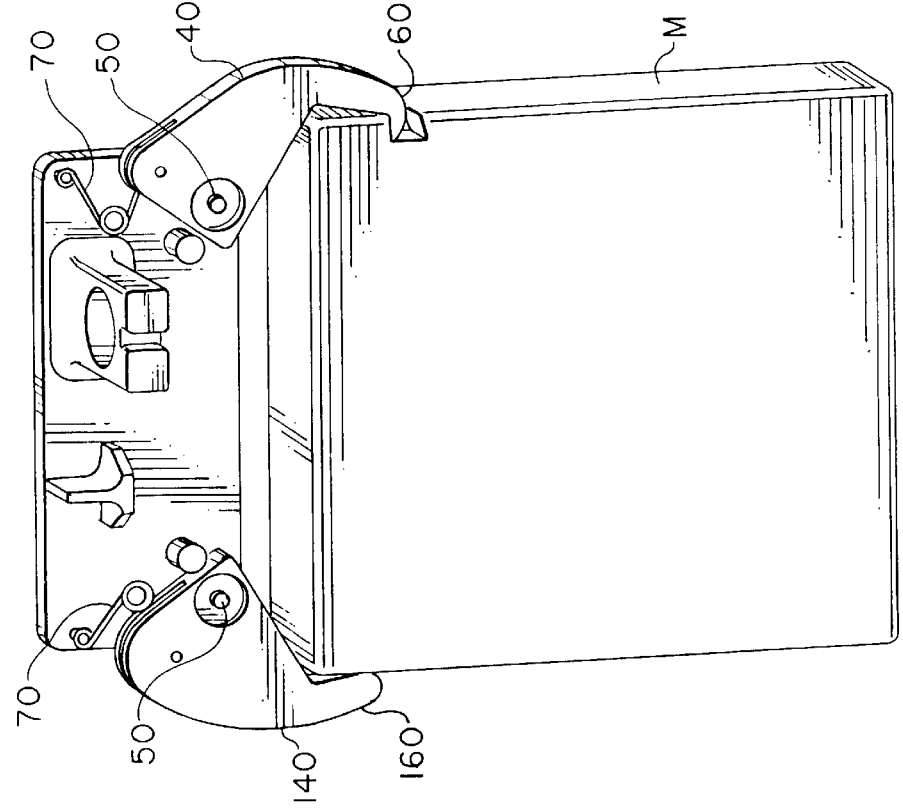

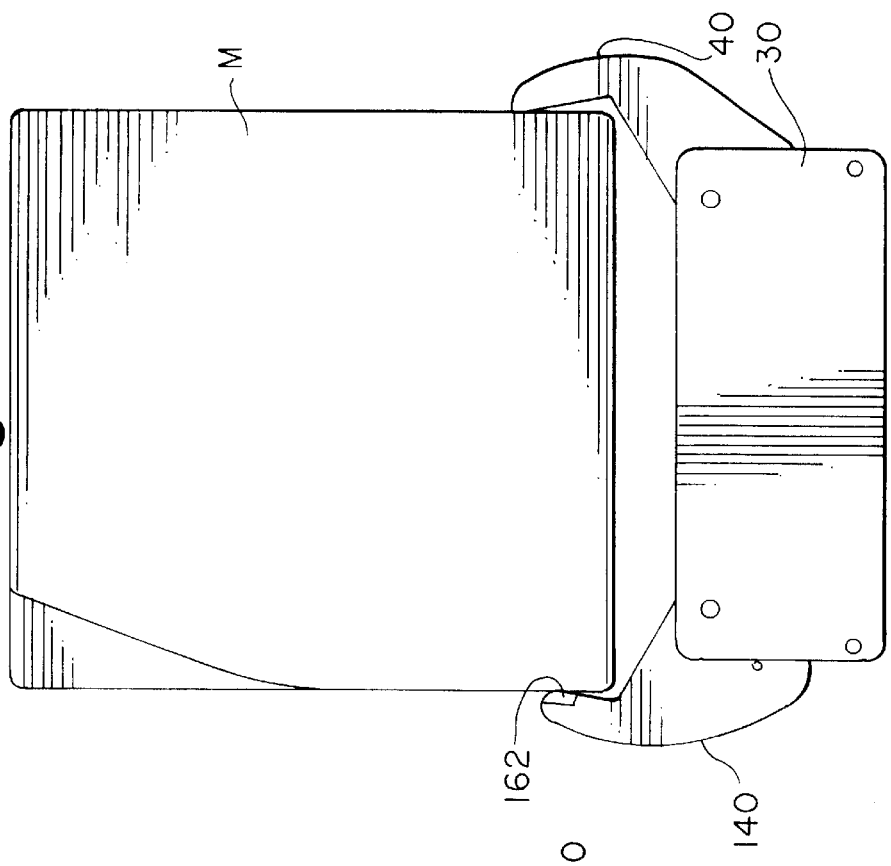
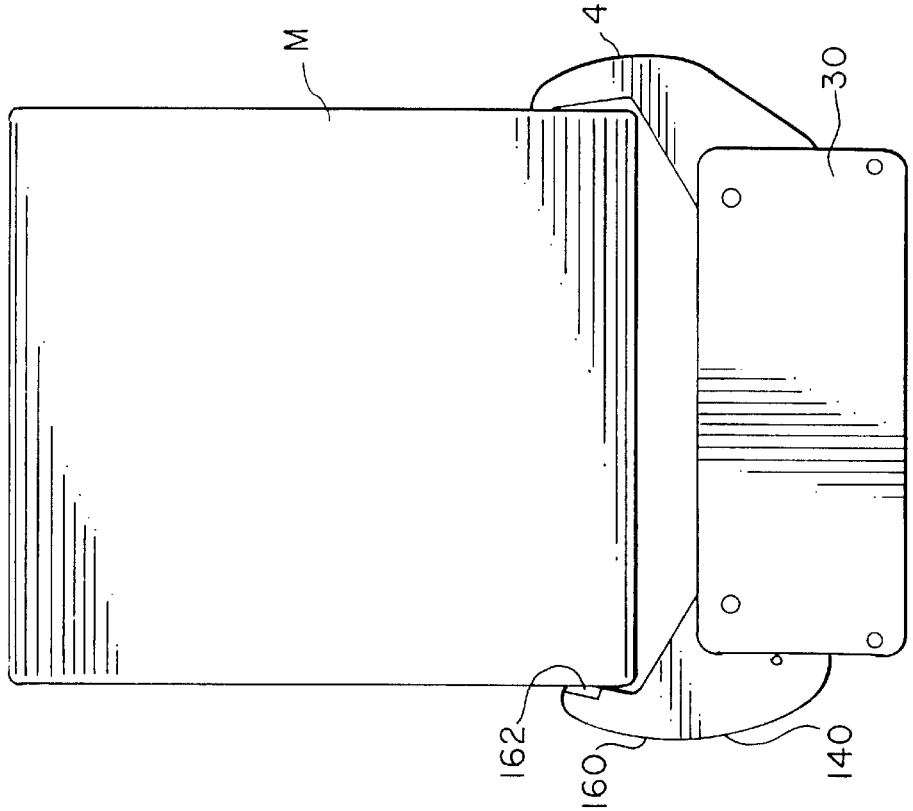

MECHANICALLY ACTUATED PICKER FOR DATA STORAGE LIBRARY

BACKGROUND OF THE INVENTION

This invention relates to an apparatus for picking and placing media from/into stores and drives of a data storage library, and in particular to an apparatus to pick and place media without electrical actuation or separate mechanical actuation means of grasping and releasing the media. The present invention has application for any cartridge based media in any application in which picking and placing media is required.

Previous techniques have required an electrical actuation or separate mechanical actuation means of grasping and releasing the media. In particular, these previous techniques required fingers attached to a picker assembly, that when extended outward from the media transport assembly (MTA), would move to an open position by means of an opening spring. When the picker was extended sufficiently, solenoids or other actuation means would impose on the fingers and cause them to reorient such that engagement with the media would occur. The media transport assembly would then retract the picker and fingers, thereby pulling the media into the MTA. When retracted sufficiently, the actuation device could be released or terminated and the fingers would remain in the closed position as a result of the capturing of the fingers within the guide rails of the MTA. When restoring media into storage slots, drives, or other media handling devices, the MTA would push the picker and media outward and when the fingers extended sufficiently beyond the guide rails of the MTA, would reorient to an open position by means of an opening spring, thereby releasing the media. Upon completion of the storage of the media, the picker members would be retracted.

A problem with this technique is that there is no positive control keeping the fingers in contact with the media after the opening spring extends the fingers, during the operation of restoring media into the storage slots or drives. Careful coordination and timing must therefore be provided so that the opening spring does not release the media until the media is securely placed within the storage slot or drive.

Attempts have been made to avoid the need for a separate electrical or mechanical actuation means, for example as disclosed in U.S. Pat. No. 5,014,255 (Wanger et. al.). However, Wanger et. al. requires for its operation separate track means on a guide assembly to force the picker member towards and away from the media. The Wanger patent is much more complex and expensive to build than need be the case.

There is a need for an apparatus for picking and placing media from/into stores and drives of a data storage library that does not require an electrical actuation means or a separate mechanical actuation means for picking and placing the media, and does so in a simpler, less expensive, and potentially more reliable manner than disclosed in Wanger et. al.

SUMMARY OF THE INVENTION

The present invention utilizes surfaces of the picking fingers and the media, and resistive forces to storage of the media, to cause opening and closing of the picker members. The fingers are driven and retained in one of two states: an open state to release media and a closed state to capture media.

Picking of media is accomplished when the picker and fingers are extended to a point in which a ramping surface on the fingers makes contact with the media. The ramping action causes the fingers to reorient towards an open state sufficiently to allow the tips of the picker members to clear the front face of the media, and the picker continues to travel outward. A closing force on the fingers causes the fingers tips to slide along the side of the media. When the picker is sufficiently extended, the closing force on the fingers causes the tips of the fingers to engage the pick feature of the media. The media transport element then pulls the picker and media into the MTA so the robotic means can move the media to the desired location.

Upon reaching the desired storage location, the storing action commences. This action is caused by the MTA pushing the picker and media outwardly. When the media reaches a position in which a sufficient resistive load is applied to the picker, ramping surfaces on the picker members cause the fingers to move towards an open position. These ramping surfaces make contact with the media and further outward motion of the picker causes the fingers to continue towards an open position. When the fingers reach a sufficient open position, the closing force on the fingers is reoriented, thereby causing the fingers to continue to a fully open position. The fingers are retained in the fully open position by the forcing element.

After the media is stored, the MTA retracts the picker and when sufficiently retracted, a ramping surface of the fingers contacts the guide rails of the MTA and the fingers are reoriented to the closed position again.

The forces necessary to retain the fingers in an open or closed position may be accomplished by a toggling means. This toggling is generated by reorienting a force over the pivoting location of the fingers.

A principal object and advantage of the present invention is that no separate electrical or mechanical actuation means is required to grasp and release the media, thus saving the cost and complexity of such an additional component.

A second principal object and advantage of the present invention is that it provides positive control pressure biasing the picker fingers against the media until the resistive force of the media against the moving carriage causes the apparatus to toggle the picker fingers open, thereby ensuring that the media is securely placed within a store or drive before the picker fingers release.

BRIEF DESCRIPTION OF THE DRAWINGS

FIGS. 13.1–13.5 show a third embodiment of the present invention

FIGS. 16a and 16b are the same as FIGS. 15a and 15b, but are bottom perspective views;

FIG. 19a is a top plan view of the present invention as the picker member engages the media, including a second picker member according to any of the embodiments shown in the previous figures, and including a friction pad, for use with DLT media.

FIG. 19b is the same as FIG. 19a, but showing use with LTO media;

DETAILED DESCRIPTION OF THE PREFERRED EMBODIMENTS

Figure 13:
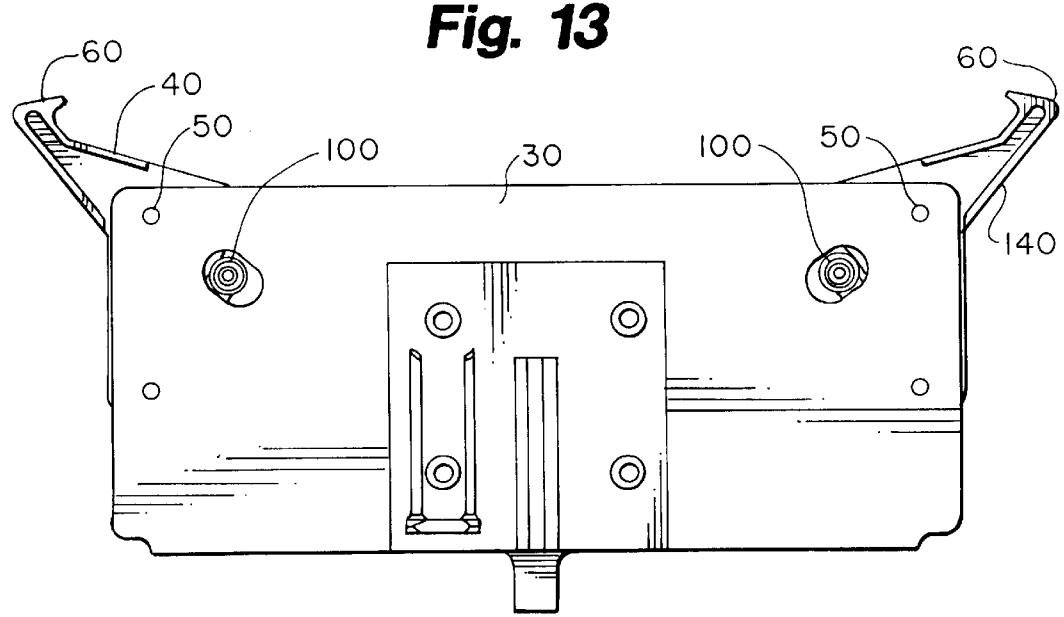
FIG. 13 is a bottom plan view showing the second embodiment of the present invention in the same position as FIG. 5 (the media is not shown)
Figures 1, 13:
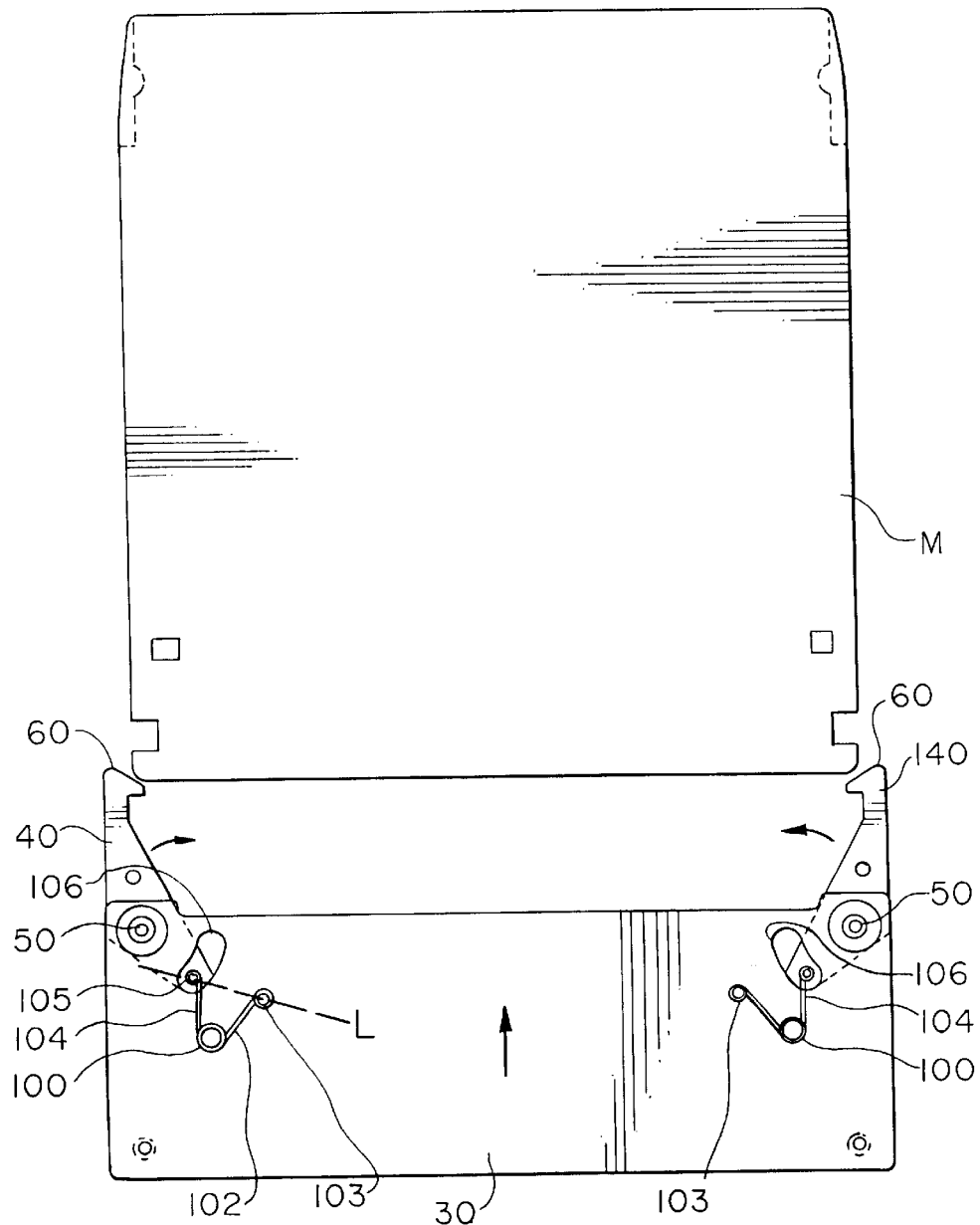
FIG. 1 shows a media transport element (MTA) to be used with the present invention, and shows the apparatus of the present invention in the open and closed state.
Figures 2, 13:
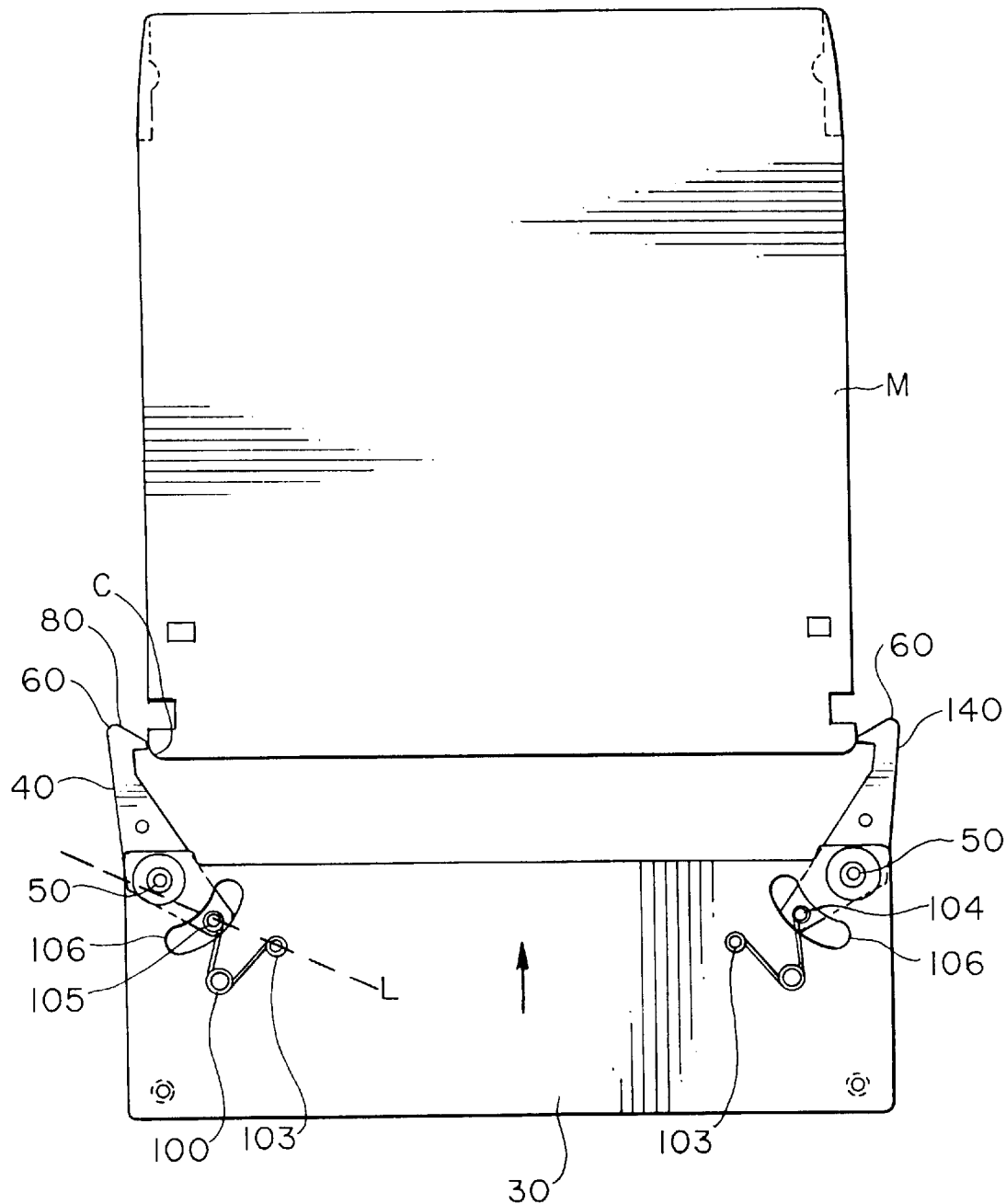
Figures 3, 13:
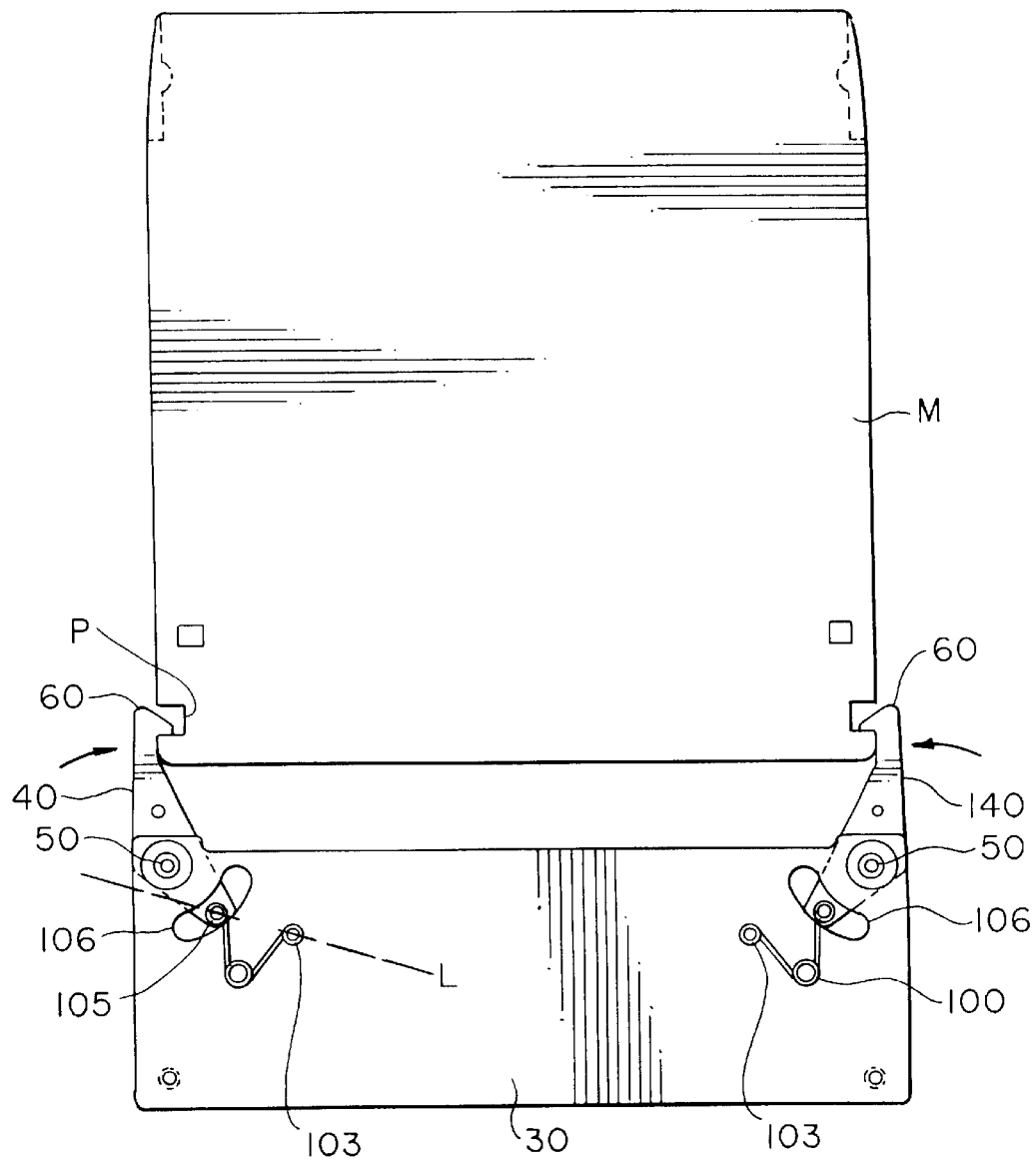

A media transport assembly (MTA) for use with the present invention is shown in FIG. 1. The MTA 10 comprises a housing 12 having guide rails 14 for guiding the movement of the apparatus 20 of the present invention into and out of the housing 12.

Figure 2:
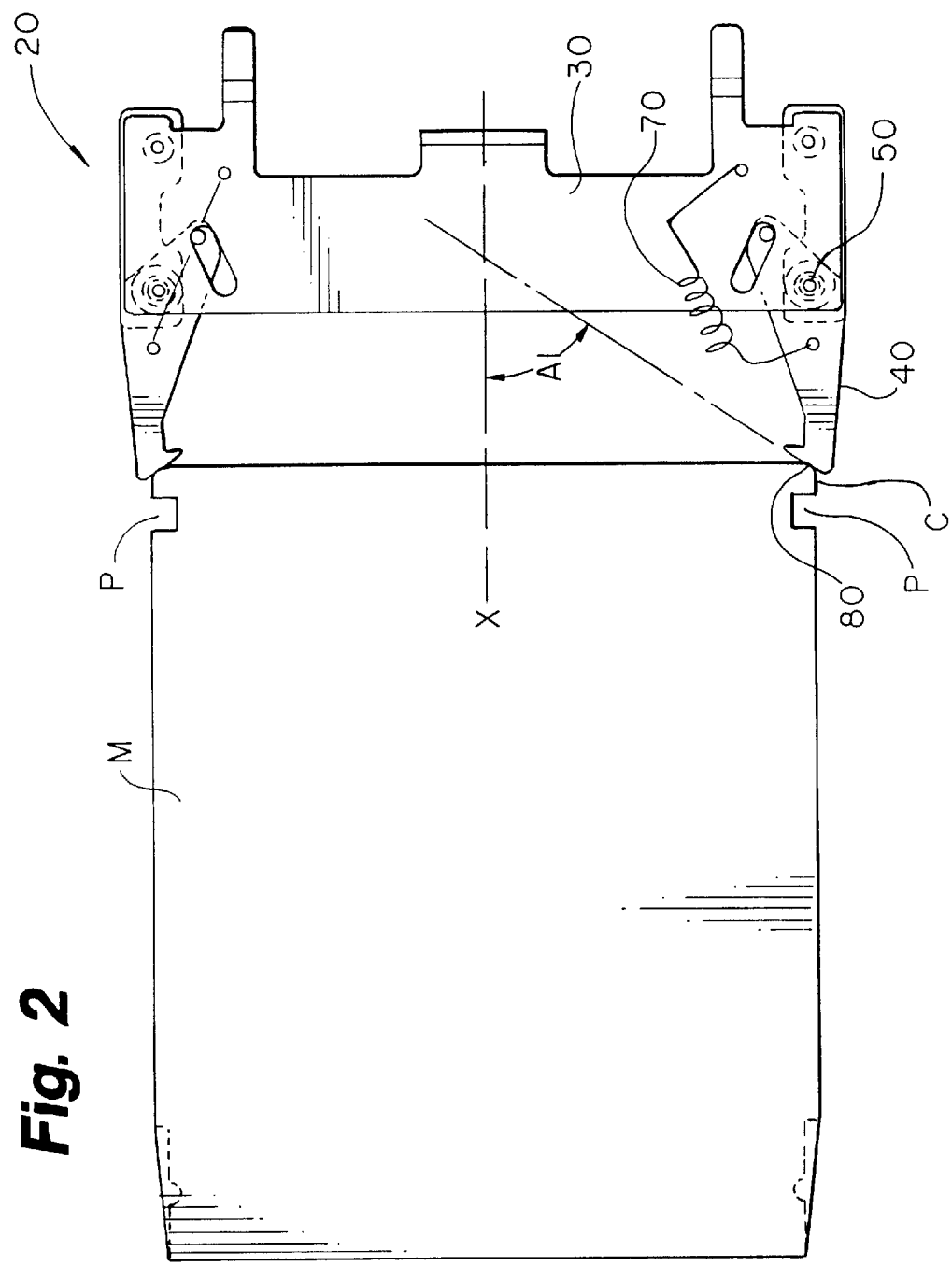
FIG. 2 shows the apparatus of the present invention as it approaches media M supported in a store or drive (not shown) in order to pick the media from the store or drive.

FIG. 2 shows an MTA with two of the present invention apparati, one in the open state and one in the closed state.

The apparatus 20 of the present invention comprises a carriage 30 movable toward and away from the media M, which are supported in the stores and drives of a data storage library. It will be understood by one of ordinary skill in the art that such data storage libraries have a plurality of stores for storing media while the media are not in use and a plurality of drives for reading data from the media. Media are transported between the stores and drives by a media transport assembly (MTA) and are picked from the stores and drives and placed into the stores and drives by the apparatus of the present invention. The carriage 30 is supported on the MTA for movement to and from the stores and drives.

The apparatus 30 also comprises at least one picker member 40 attached to the carriage 30 at a pivot point 50. The picker member 40 has latching portion 60 adapted to engage the pick feature P of the media M. The pick feature P is typically a notch in the cartridge containing the media.

Figure 5:
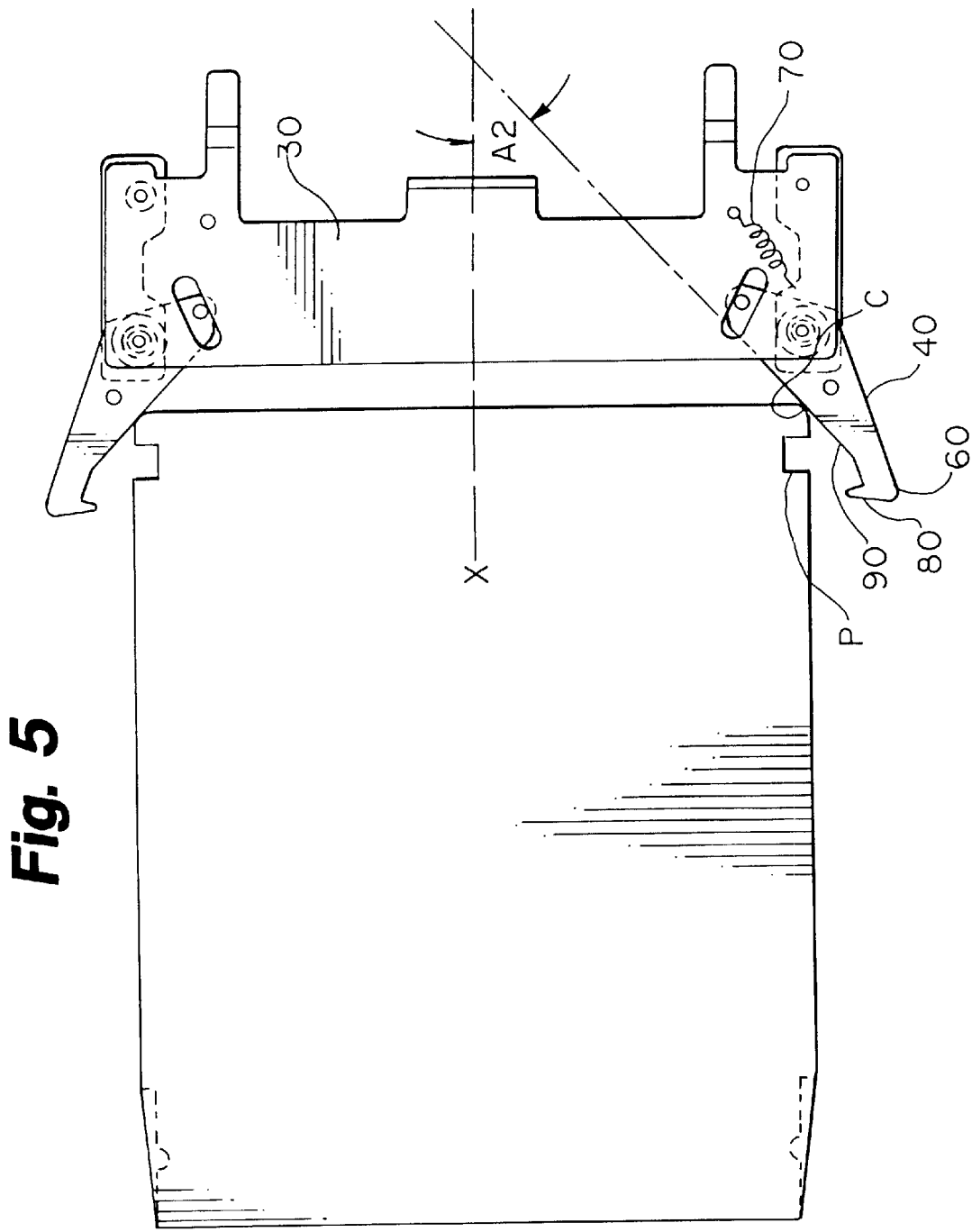
FIG. 5 shows the latching member of the present invention deflected outwardly to the open position by a ramping surface on the picker member cooperating with a curved surface on the media pick feature.

The picker member 40 is movable between an open state (FIG. 5) wherein the latching portion 60 is spaced from the media's pick feature P and a closed state (FIG. 4) wherein the latching portion 60 engages the media's pick feature P.

A spring means 70 is alternately orientable between a first orientation (FIG. 2) wherein the spring means 70 biases the picker member 40 towards the media M and a second orientation (FIG. 5) wherein the spring means 70 biases the picker member 40 away from the media M. The picker member 40 is alternately biased into the closed state and the open state by the spring means 70.

The movement of the picker member 40 between the open state and the closed state is caused by the movement of the picker member 40 against the media M supported in the stores and drives, as will be seen below. Importantly, the closing and opening of the picker member 40 does not require the picker member 40 to cooperate with any electrical or separate mechanical actuation means.

Turning now to FIG. 2, the operation of the apparatus 20 of the present invention will be explained in general terms.

In FIG. 2, the media M is supported in a store or drive (not shown) of a data storage library. The apparatus 20 will be moved toward the media M in the direction shown by the arrow by some external driving means (typically an electrically-actuated lead screw on the MTA).

Figure 3:
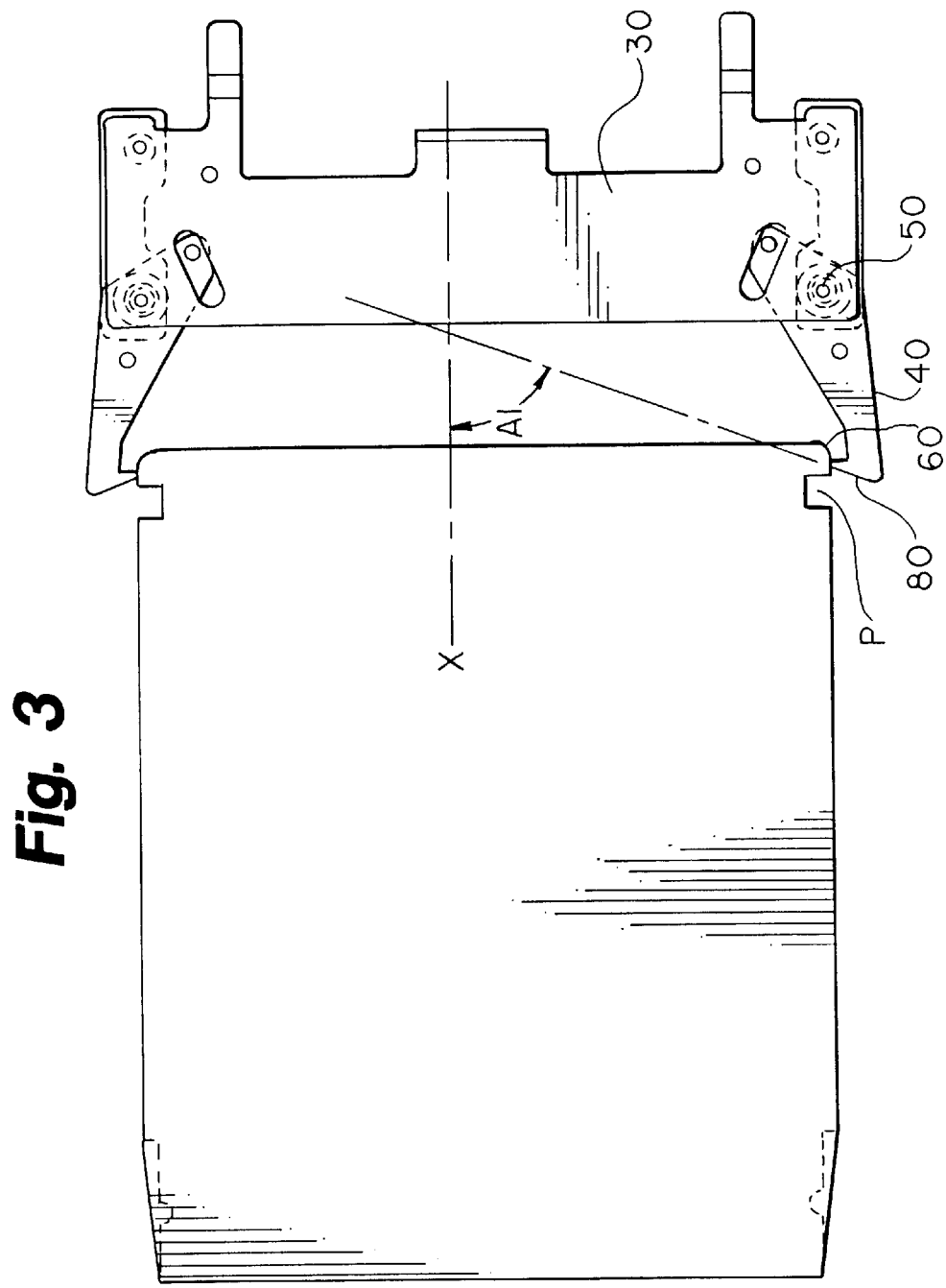
FIG. 3 shows the latching member of the present invention being deflected outwardly by a curved surface on the pick feature of the media M.

As the apparatus 20 approaches the media M, the picker member 40 encounters the media M. Generally, the media M will have a curved surface C adjacent the pick feature P. The picker member 40 has a first ramping surface 80 which, when engaging the curved surface C, causes the picker member 40 to be forced outwardly along the curved surface C to an intermediate position (FIG. 3) adjacent the pick feature P.

In more detail, the carriage suitably has a central axis X (FIG. 2) and the first ramping surface 80 slopes inwardly from the picker member 40 towards the central axis X, forming a first acute interior angle A1. It will be understood that angle A1 will vary with the motion of the picker member 40 towards and away from the media M, as shown in the Figures.

Figures 4, 13:
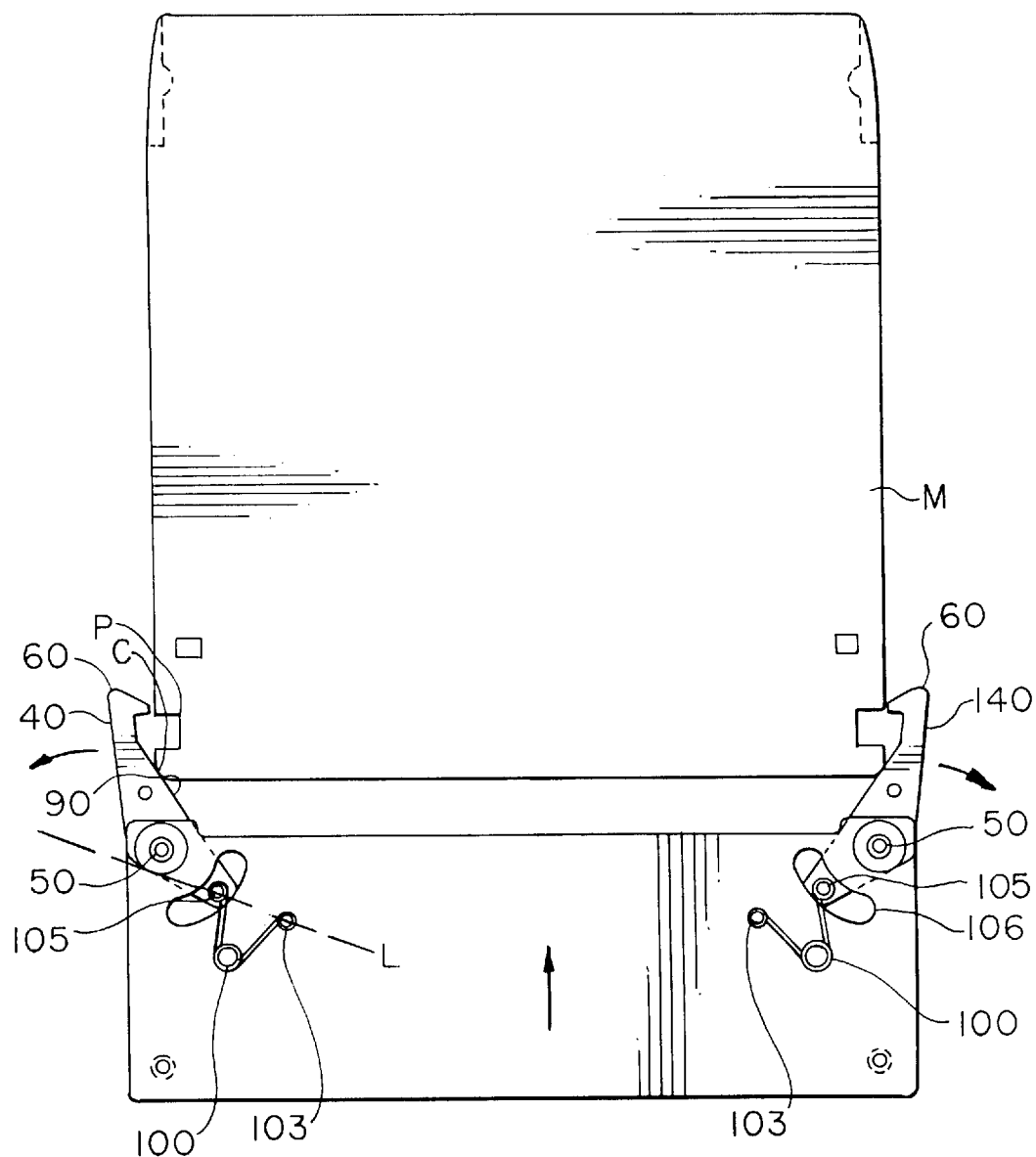
FIG. 4 shows the latching member of the present invention engaging the pick feature of the media M.
Figures 5, 13:
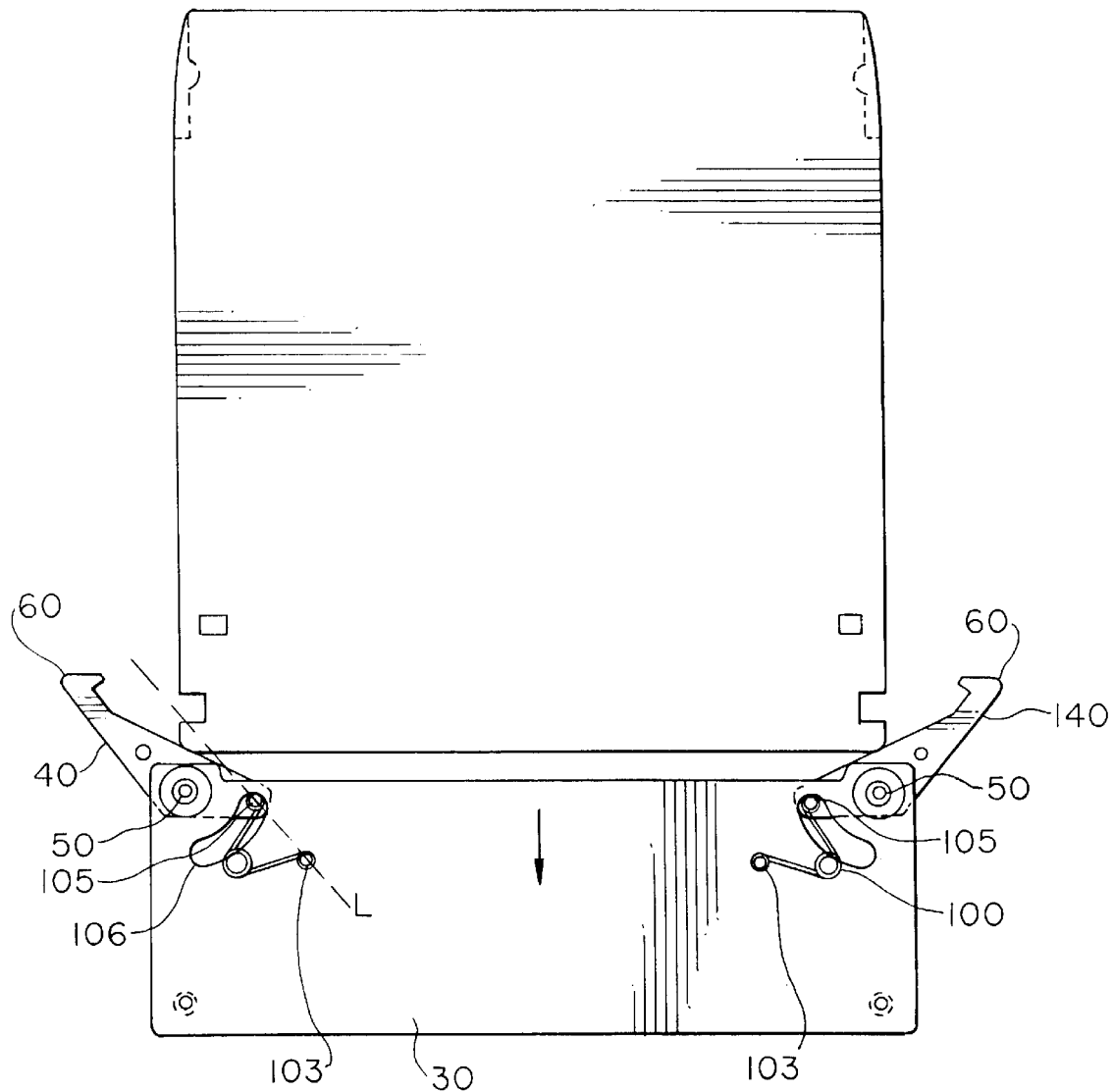

In FIG. 4, the carriage 30 has moved further toward the media M, so that the latching portion 60 has engaged the media's pick feature P. The movement of the carriage 30 may now be reversed, retracting the media M from the store or drive.

To place the media M into another store or drive, the apparatus 30 is driven toward the store or drive, suitably by the MTA. The apparatus inserts the media M into the store or drive. When the media M reaches a threshold level of resistance against the store or drive, the motion of the carriage 30 (FIG. 5) causes second ramping surface 90 to be forced outwardly from the media's pick feature P along the curved surface C of the media's pick feature, releasing the latching portion 60 from the pick feature P.

Second ramping surface 90 slopes inwardly from the picker member 40 towards the central axis X, forming a second acute interior angle A2 with the central axis X. It will be understood that angle A2 will vary with the motion of the picker member 40 towards and away from the media M, as shown in the Figures.

A first embodiment of the spring means 70 is shown in FIGS. 6–10.

In the first embodiment, the spring means 70 comprises an extension spring 70a with a first end 71 attached to the carriage 30 at a first attachment point 72 and a second end 73 attached to the picker member 40 at a second attachment point 74.

Figure 6:
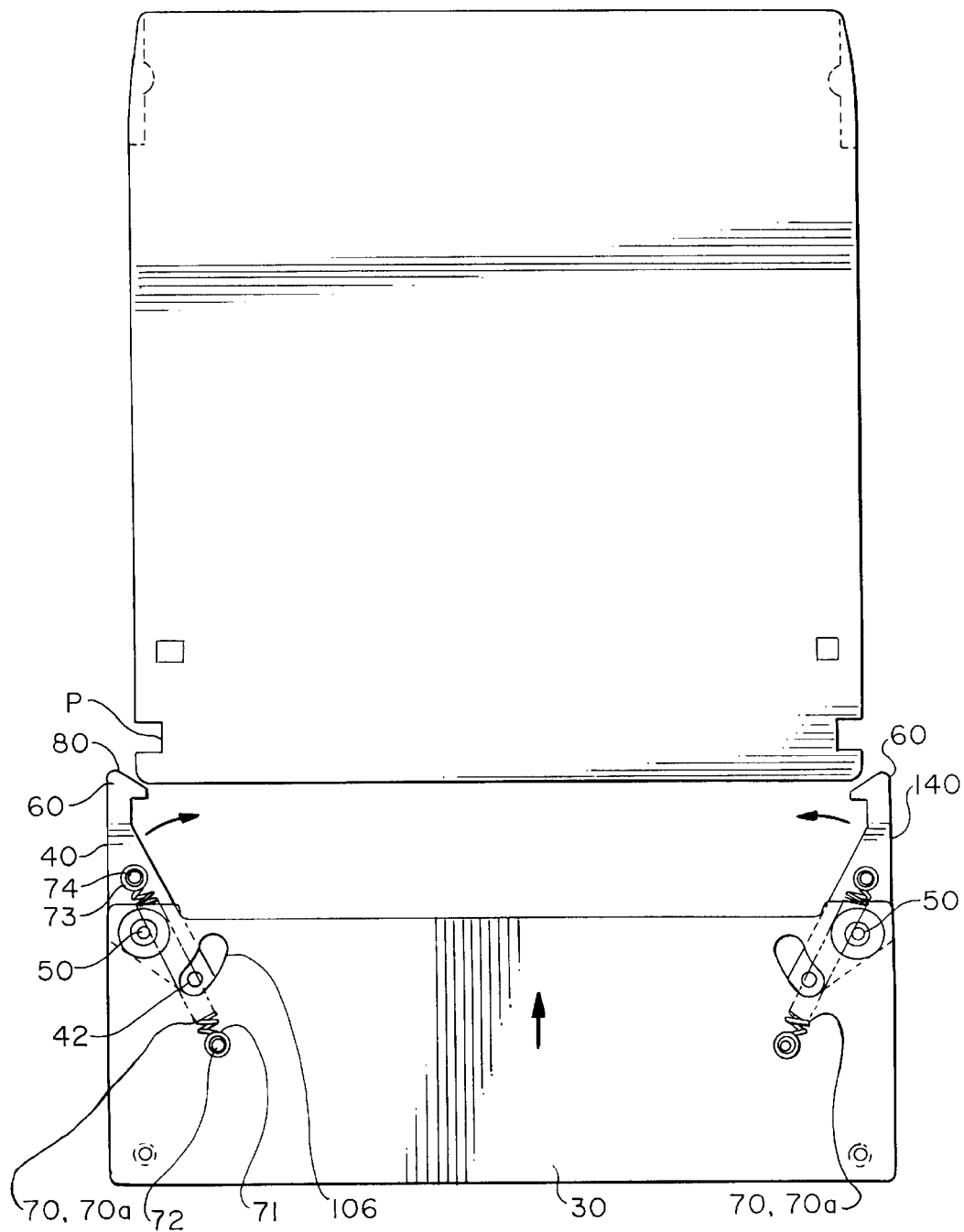
FIG. 6 shows the first embodiment of the present invention in the same position as FIG. 2.

As can be seen in FIG. 6, the pivot point 50 of the picker member 40 lies between the first attachment point 72 and the second attachment point 74, so that the extension spring 70a applies its biasing force to the picker member 40 at the second attachment point 74, rather than at the pivot point 50.

In the first orientation shown in FIG. 6, the extension spring 70a lies substantially inwardly of the pivot point 50, so that its biasing force biases the picker members 40 towards the media M.

Figure 7:
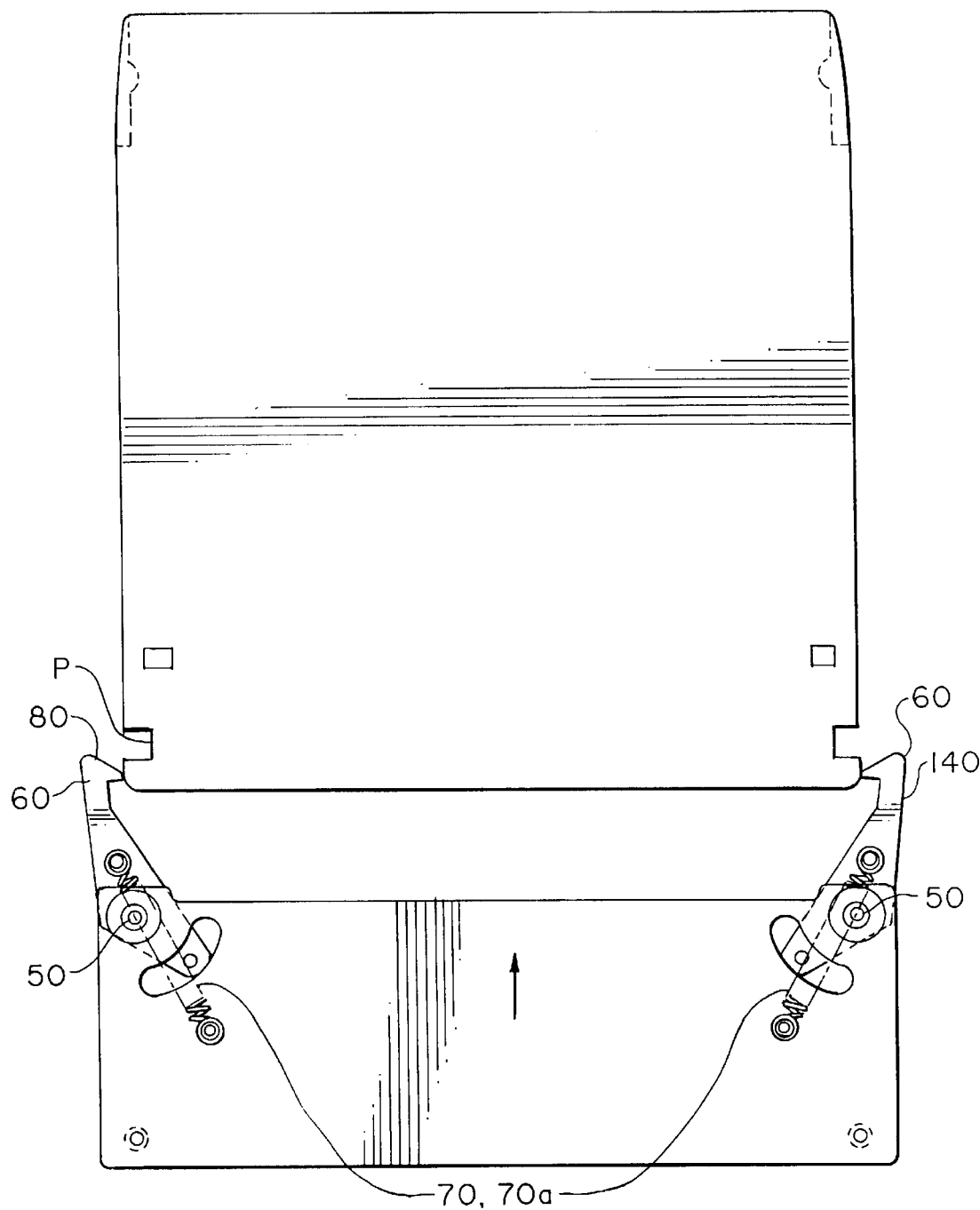
FIG. 7 shows the first embodiment of the present invention in the same position as FIG. 3.

In FIG. 7, the carriage 30 has moved further towards the media M, and the latching portion 60 has moved to an intermediate state, as previously described above and shown in FIG. 3. Because the extension spring 70a still lies inwardly of the pivot point 50, its biasing force forces the latch portion 60 against the media M.

Figure 8:
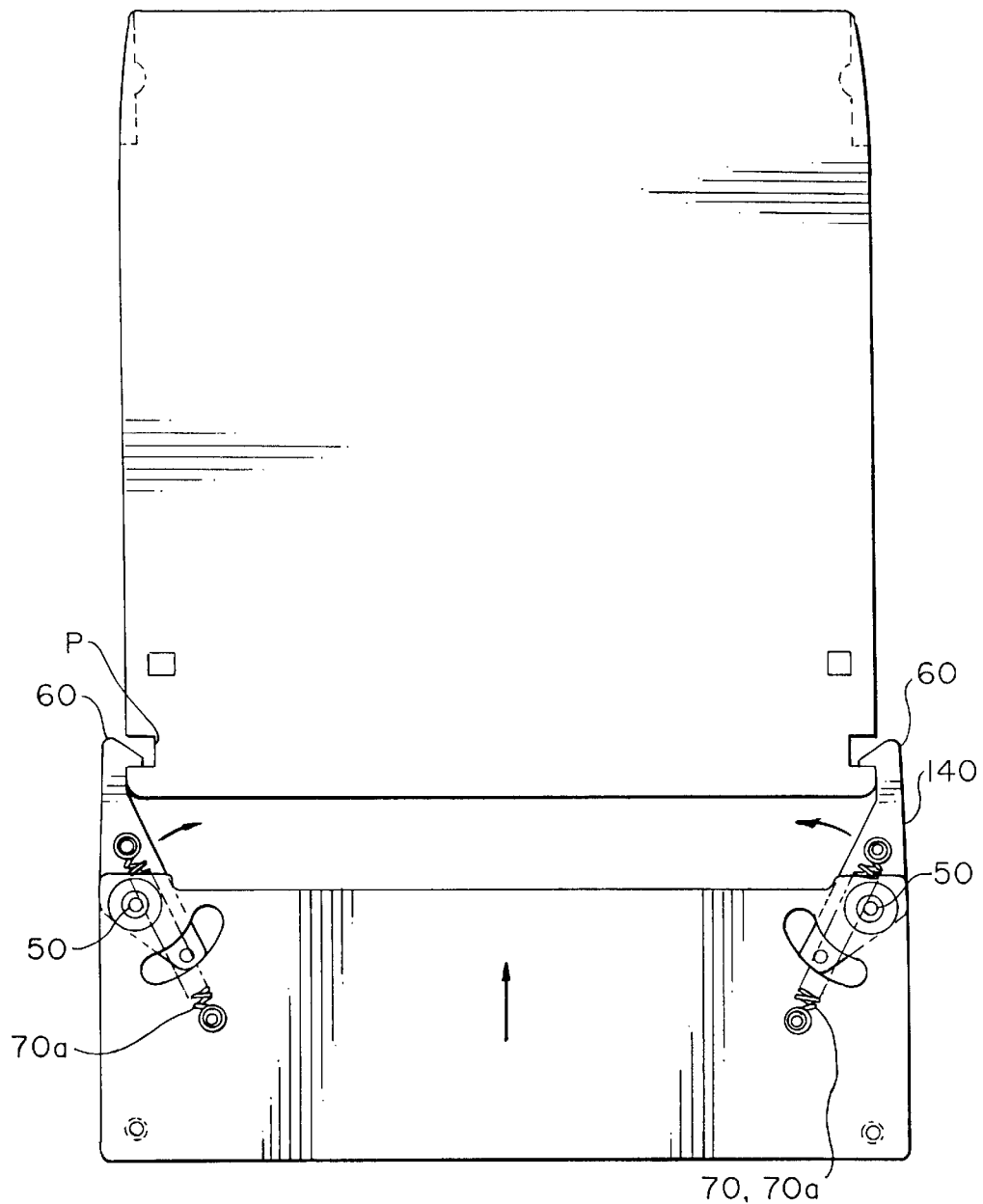
FIG. 8 shows the first embodiment of the present invention in the same position as FIG. 4.

In FIG. 8, the carriage 30 has moved further towards the media M, causing the latching portion 60, biased inwardly by the extension spring 70a, to engage the pick feature P, as previously described and shown in FIG. 4.

Figure 9:
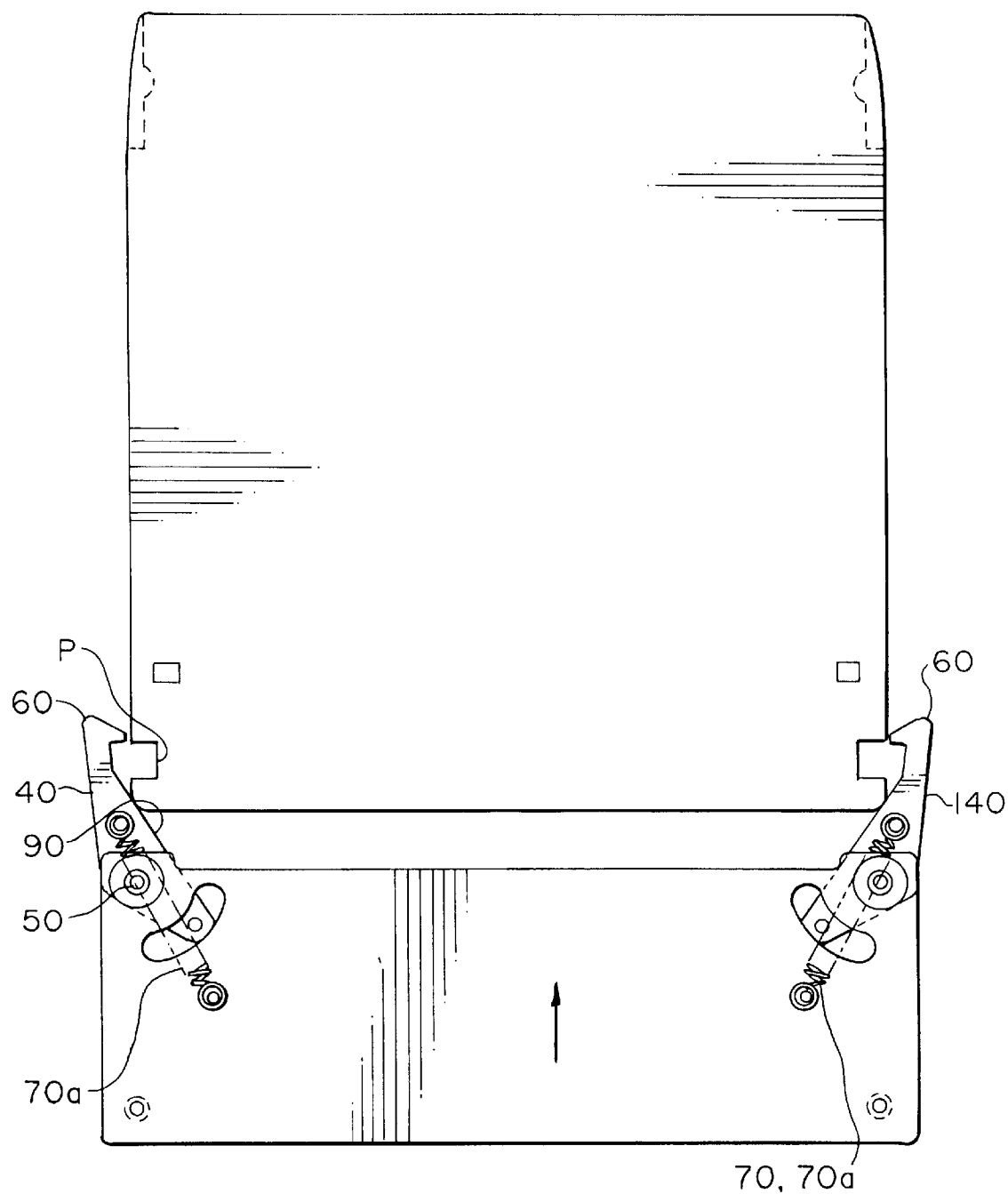
FIG. 9 shows the first embodiment of the present invention with the picker member being partially deflected outwardly by a ramping surface on the picker member cooperating with the media's pick feature.

In FIG. 9, the apparatus has now moved the media M towards another store or drive, as previously described, and has placed the media M into the store or drive. The latching portion 60 has been forced outwardly out of the pick feature P. The extension spring is still biasing the picker member 40 towards the media.

Figure 10:
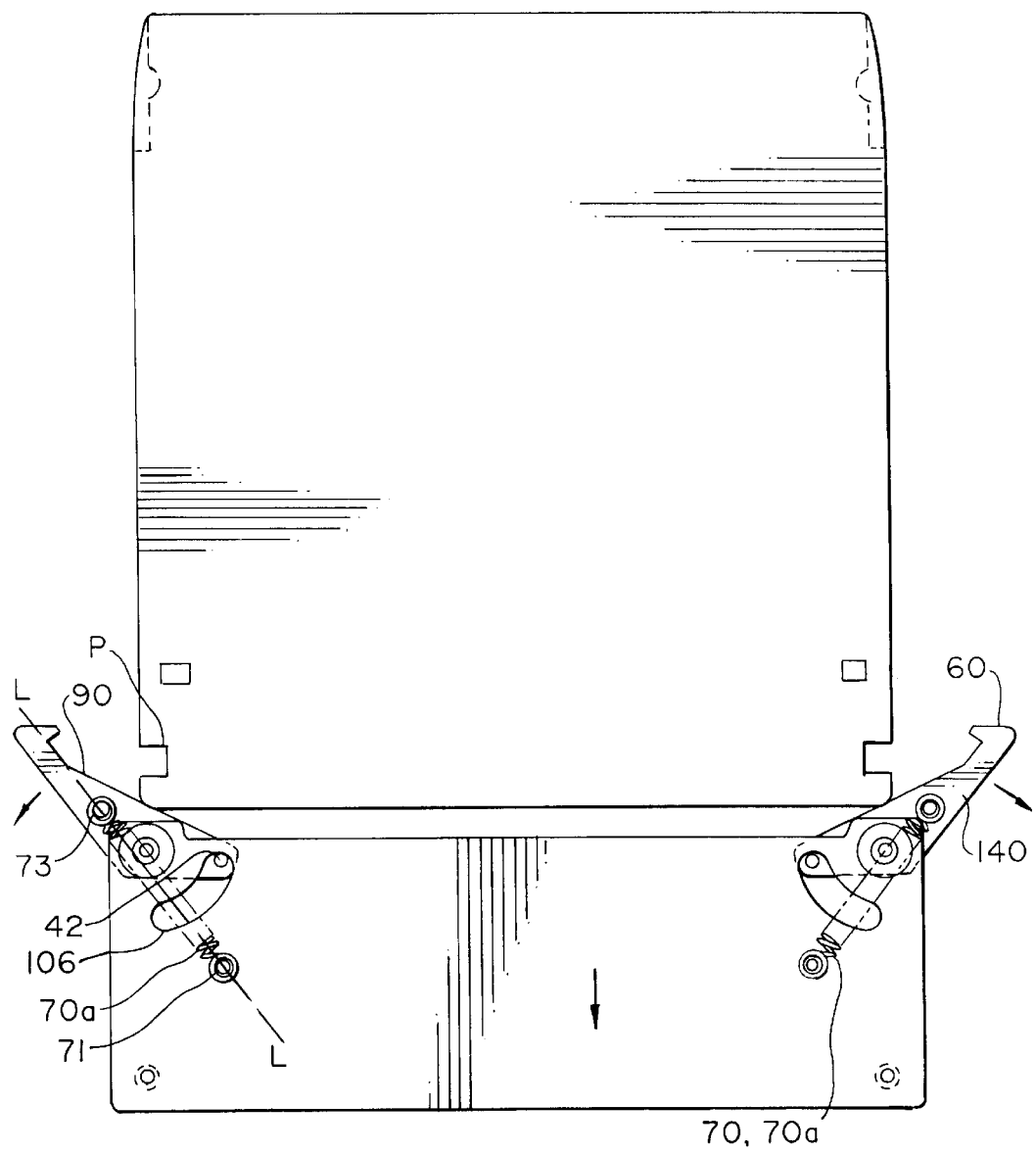
FIG. 10 shows the first embodiment of the present invention in the same position as FIG. 5.

In FIG. 10, the picker member 40 has been forced outwardly to a point at which a line L between the first attachment point 71 and the second attachment point 73 lies substantially outwardly of the pivot point P. This causes the extension spring 70a to move to its second orientation, wherein the extension spring lies substantially outwardly of the pivot point. It will be understood that the biasing force of the extension spring 70a now biases the picker member 40 away from the media M. This releases the media.

This "over-center" movement of the extension spring 70a effectuates a toggling means that toggles the picker member 40 into the open state or the closed state.

After the apparatus 20 releases the media, it may be retracted into the MTA. Preferably, the MTA has guide rails 14 that force the picker member 40 inwardly as the apparatus 20 retracts into the MTA.

As the picker member 40 moves inwardly, the extension spring 70a will move to its first orientation.

Motion of the picker member 40 is constrained by the curved slot 106 and a post 41 on the picker member 40 that moves within the slot 106, preventing the latching portion 60 from moving too far outwardly or inwardly.

Figure 11:
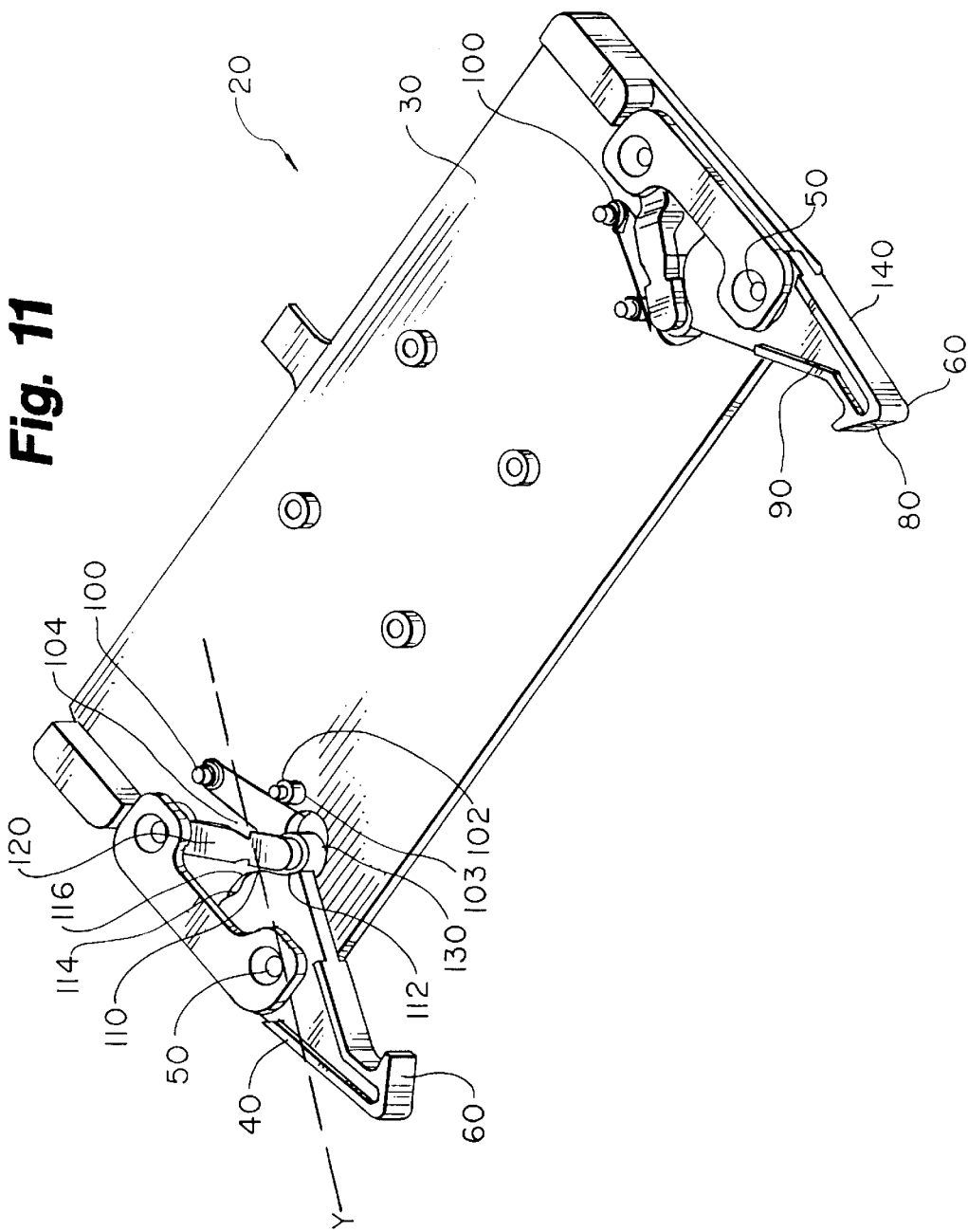
FIG. 11 is a perspective view showing a second embodiment of the present invention in the same position as FIG. 2 (the media is not shown)
Figure 12:
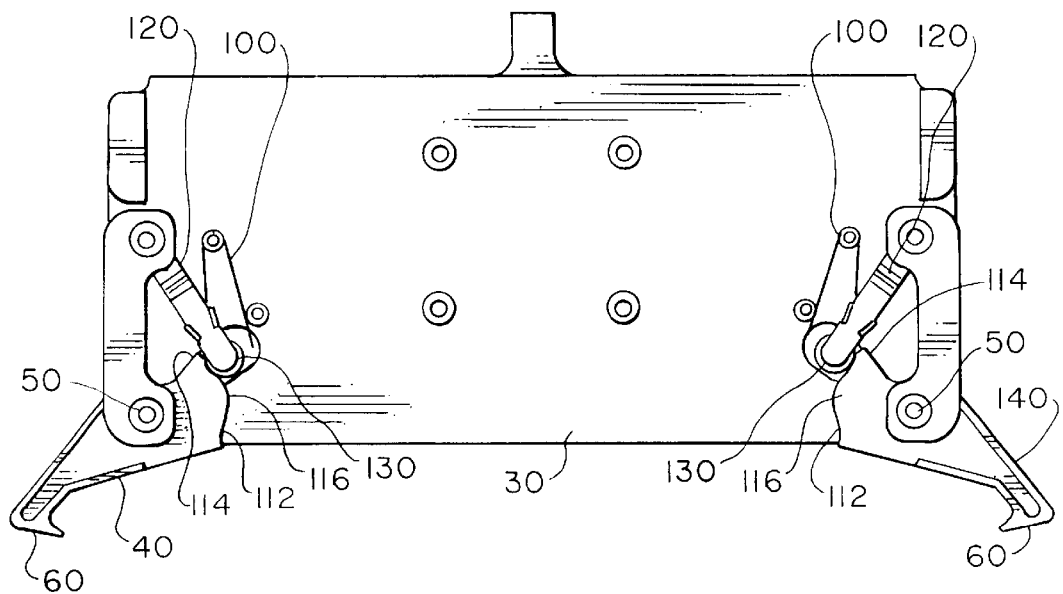
FIG. 12 is a top plan view showing the second embodiment of the present invention in the same position as FIG. 5 (the media is not shown)

A second embodiment of the apparatus of the present invention is shown in FIGS. 11–13.

As can be seen, the second embodiment of the apparatus 20 comprises the same portions as previously described, except that instead of the extension spring 70a a torsion spring 100 is the spring means 70 employed to provide a biasing force. The torsion spring 100 has a first end 102 attached to the carriage at a first attachment point 103 and a second end 104.

The apparatus 20 further comprises a camming surface 110 on the picker member 40. The pivot point 50 of the picker member lies between the latching portion 60 and the camming surface 110.

A pivoting arm 120 is attached to the carriage 30 and the second end 104 of the torsion spring is attached to the pivoting arm 120.

The pivoting arm 120 has a roller 130 contacting the camming surface 110, and the torsion spring 100 biases the roller 130 against the camming surface 110.

The picker member 40 has a central axis Y, and the camming surface 110 has a first detent surface 112 inward of the central axis Y and a second detent surface 114 outward of the central axis Y. Preferably, the camming surface 110 is smoothly curved, having a central portion 116 extending away from the pivot point 50 at the central axis Y, with first detent surface 112 and second detent surface 114 being on opposite sides of the central portion 116.

In operation, as the latching portion 60 is deflected outwardly by the second ramping surface 90 contacting the curved surface C of the media (as previously described), the roller 130 moves from the first detent surface 112 to the second detent surface 114, preferably moving over the central portion 116 (which provides a toggling action). When the roller 130 engages the second detent surface 114, the force of the torsion spring 100 against the roller 130 biases the picker member 40 outwardly from the media M. (FIG. 12)

When the picker member 40 is retracted into the MTA and the picker member 40 moves inwardly, the roller 130 moves from the second detent surface 114 to the first detent surface 112, preferably over the central portion 116 (which provides a toggling action). When the roller 130 contacts the first detent surface 112, the force of the torsion spring 100 against the roller 130 biases the picker member 40 inwardly toward the media M. (FIG. 11).

A third embodiment of the present invention is shown in FIGS. 13.1–13.5.

In the third embodiment, torsion spring 100 is employed to provide the biasing force. Torsion spring 100 has a first end 102 attached to the carriage 30 at a first attachment point 103 and a second end 104 attached to the picker member 40 at a second attachment point 105. The second attachment point 105 is between the first attachment point 103 and the pivot point 50.

FIG. 13.1 shows the apparatus 20 as it approaches the media M, supported in a store or drive (not shown). The torsion spring is biasing the picker member 40 inwardly toward the media M because the line L (between the first attachment point 103 and second attachment point 105) lies substantially outwardly of the pivot point 50. Thus, the force tending to cause the torsion spring to expand between the first attachment point 103 and the second attachment point 105 is applied along the line L, causing the picker member 40 to pivot inwardly about pivot point 50.

Motion of the picker member 40 is constrained by the curved slot 106, the second attachment point suitably being a post moving within the slot 106. This prevents the latching portion 60 from moving too far inwardly.

FIG. 13.2 shows the third embodiment after the picker member 40 has been deflected outwardly by the first ramping surface C of the media, as previously described. Because the line L still lies substantially outwardly of the pivot point 50, the torsion spring still biases the picker member 40 towards the media M.

In FIG. 13.3, the movement of the carriage 30 has caused the latching portion 60 to engage the pick feature P. Because the line L still lies substantially outwardly of the pivot point 50, the torsion spring still biases the picker member 40 towards the media M.

In FIG. 13.4, the carriage 30 has moved the media M to another location (a store or drive) and is inserting the media M into the store or drive. As previously described, the second ramping surface 90 moving along the curved surface C is forcing the picker member 40 outwardly away from the media M. Because the line L still lies substantially outwardly of the pivot point 50, the torsion spring still biases the picker member 40 towards the media M.

In FIG. 13.5, the picker member 40 has moved far enough outwardly that the torsion spring 100 has reoriented to its second orientation. As can be seen, the line L now lies substantially inwardly of the pivot point 50, so that the expansion force between the first attachment point 103 and second attachment point 105, applied along the line L, causes the picker member to pivot outwardly about pivot point 50. Motion of the picker member 40 is constrained by the curved slot 106, the second attachment point suitably being a post moving within the slot 106. This prevents the latching portion 60 from moving too far outwardly.

For use in picking and placing LTO tape media (which have two symmetrical pick features or slots), the present invention advantageously includes a second picker member 140 which may operate in accordance with any of the previously described embodiments. That is, the second picker member 140 may have latching portion 60, a spring means 70 that comprises an extension spring 70a or a torsion spring 100, and may include the pivoting arm 120, roller 130, and camming surface 110 with first detent surface 112, second detent surface 114, and central portion 116 previously described.

It is also necessary to pick and place DLT tape media (which have only one pick feature or slot). Nevertheless, a second picker member is preferable in the case of DLT media to prevent a tendency of the media to rotate when picked only from one side.

In the case of DLT media, a second picker member 140 is provided as previously described, but rather than having a latch portion 60 that engages a second pick feature, the latch portion 160 of the second picker member simply engages the media. This may be accomplished in several ways.

In the first embodiment (shown in FIGS. 14–18), the second picker member 140 simply directly engages the media on the side of the media opposite the first picker member 40. The force of the spring means 70 biasing the latch portion 160 of the second picker member against the media prevents rotation of the media.

Figure 14A:
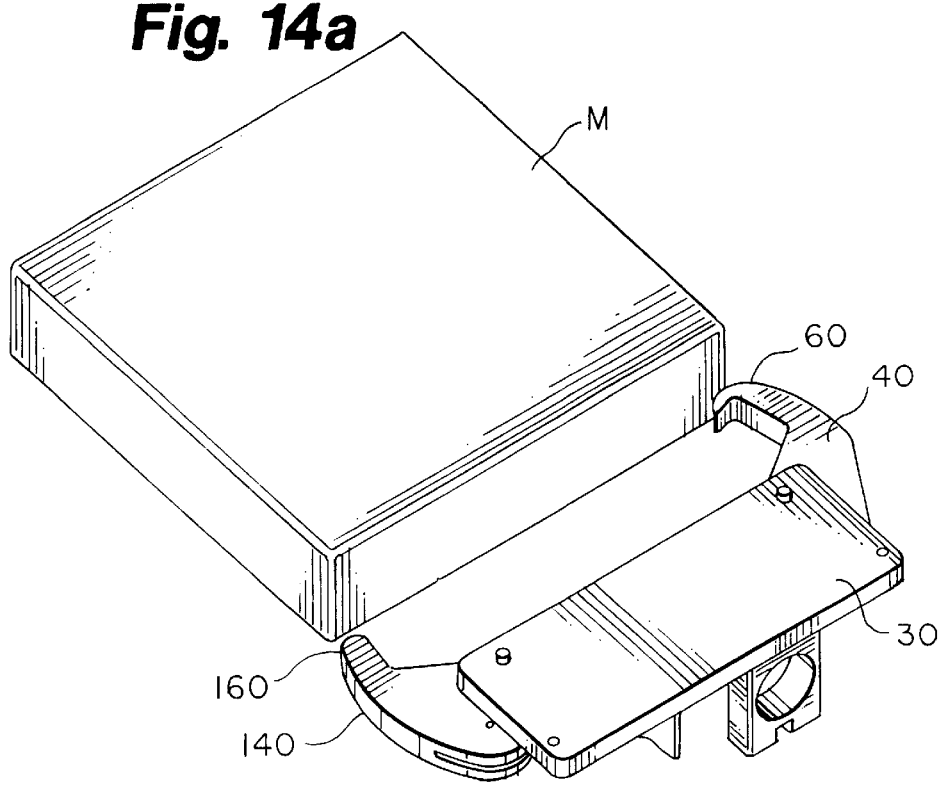
FIG. 14a is a top perspective view of the present invention as the picker member approaches the media, including a second picker member according to any of the embodiments shown in the previous figures, for use with DLT media.
Figure 14B:
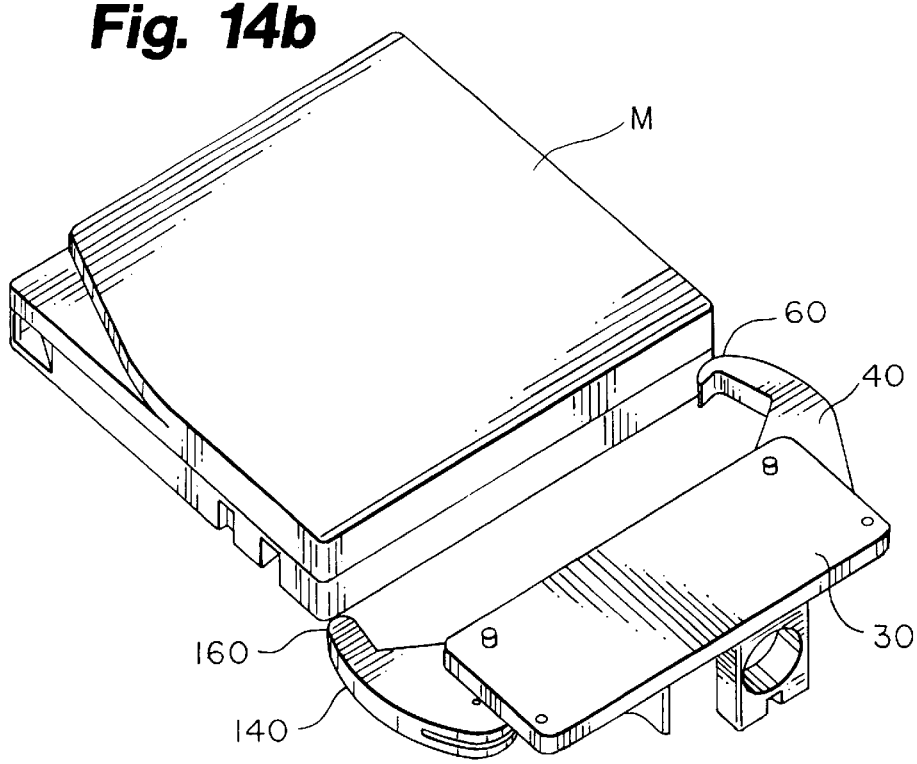
FIG. 14b is the same as FIG. 14a, but showing use with LTO media.
Figure 14D:
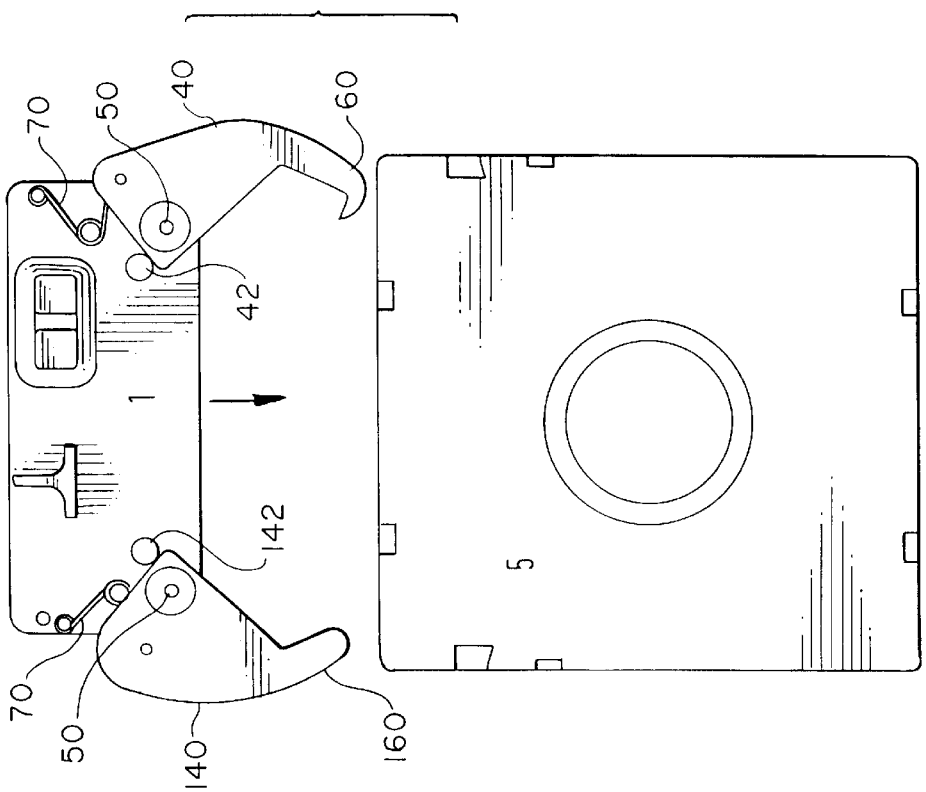
FIG. 14d is the same as FIG. 14b, except being a bottom plan view.
Figure 14C:
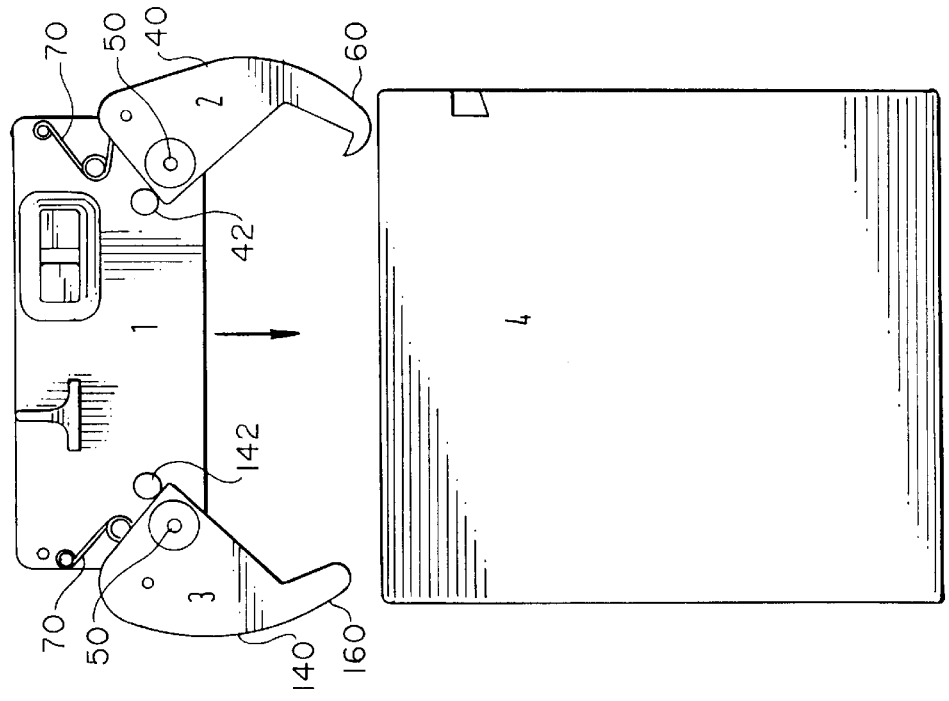
FIG. 14c is the same as FIG. 14a, except being a bottom plan view.

FIG. 14a shows the first embodiment as the picker members 40, 140 are about to engage DLT media. FIG. 14b shows the first embodiment as the picker members 40, 140 are about to engage LTO media.

Figure 15A:
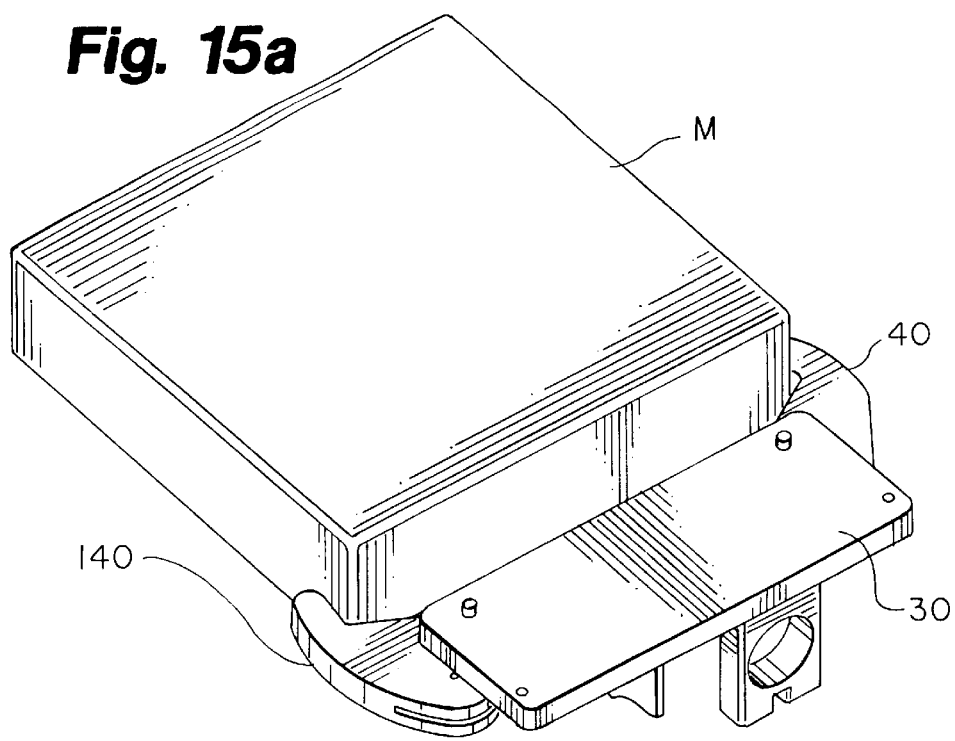
FIG. 15a is a top perspective view of the present invention as the picker member has engaged the media, including a second picker member according to any of the embodiments shown in the previous figures, for use with DLT media.
Figure 15B:
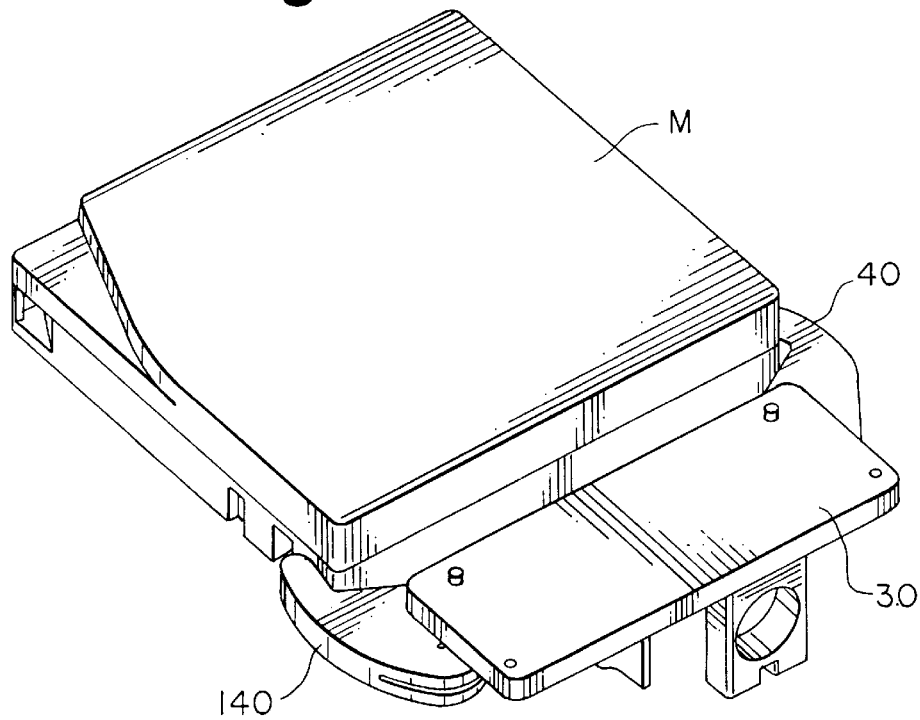
FIG. 15b is the same as FIG. 14a, but showing use with LTO media.

FIGS. 15a and 16a show the first embodiment with both of the picker members 40, 140 engaging DLT media. FIG. 15b and 16b show the first embodiment with both of the picker members 40, 140 engaging LTO media.

Figure 17A:
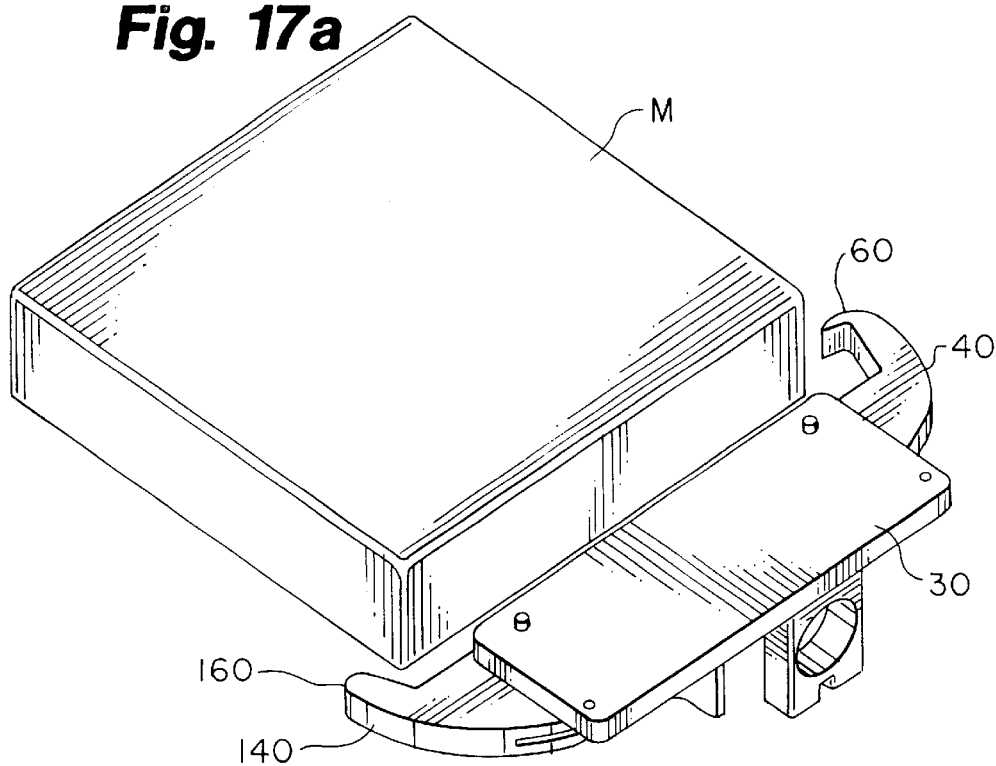
FIG. 17a is a top perspective view of the present invention as the picker member withdraws from the media, including a second picker member according to any of the embodiments shown in the previous figures, for use with DLT media.
Figure 17B:
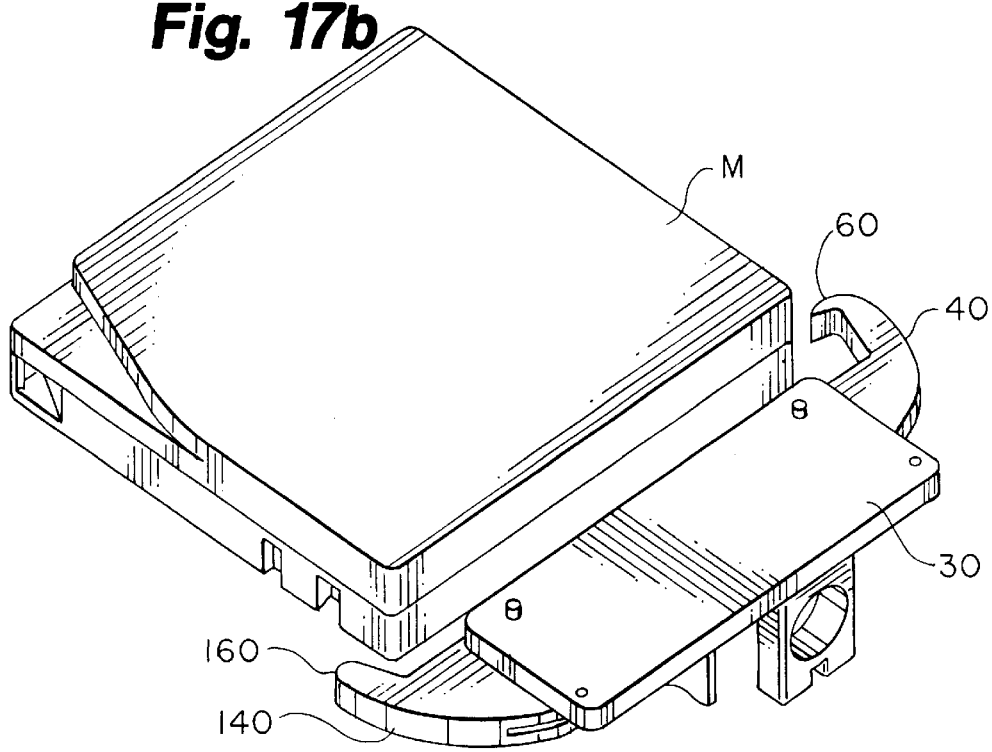
FIG. 17b is the same as FIG. 17a, but showing use with LTO media.
Figure 18A:
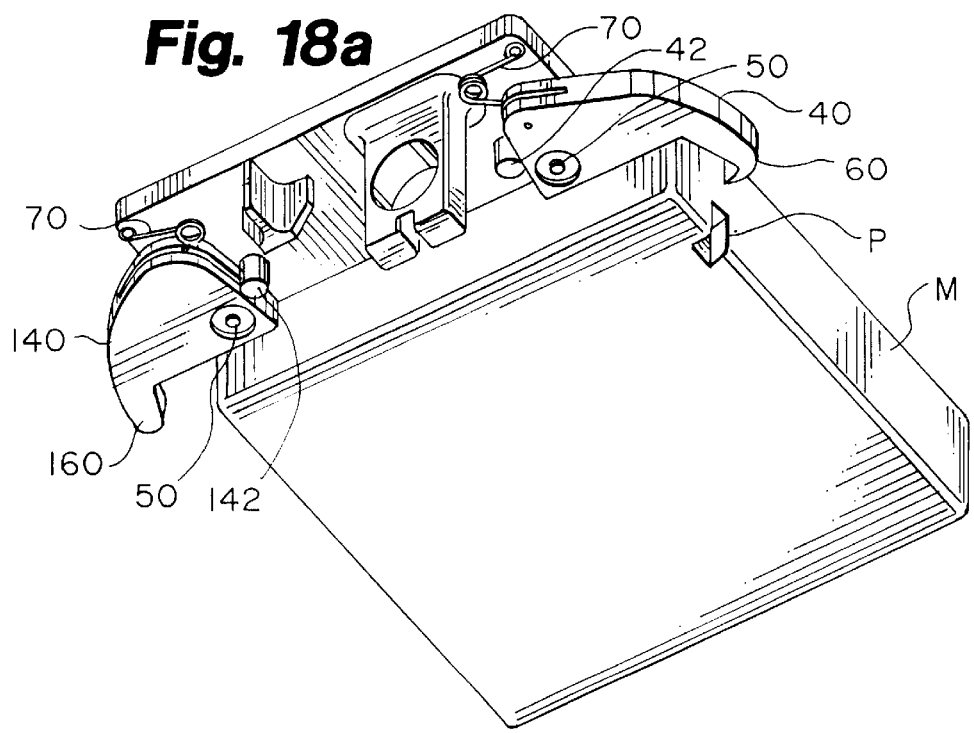
FIGS. 18a and 18b are the same as FIGS. 17a and 17b, but are bottom perspective views.
Figure 18B:
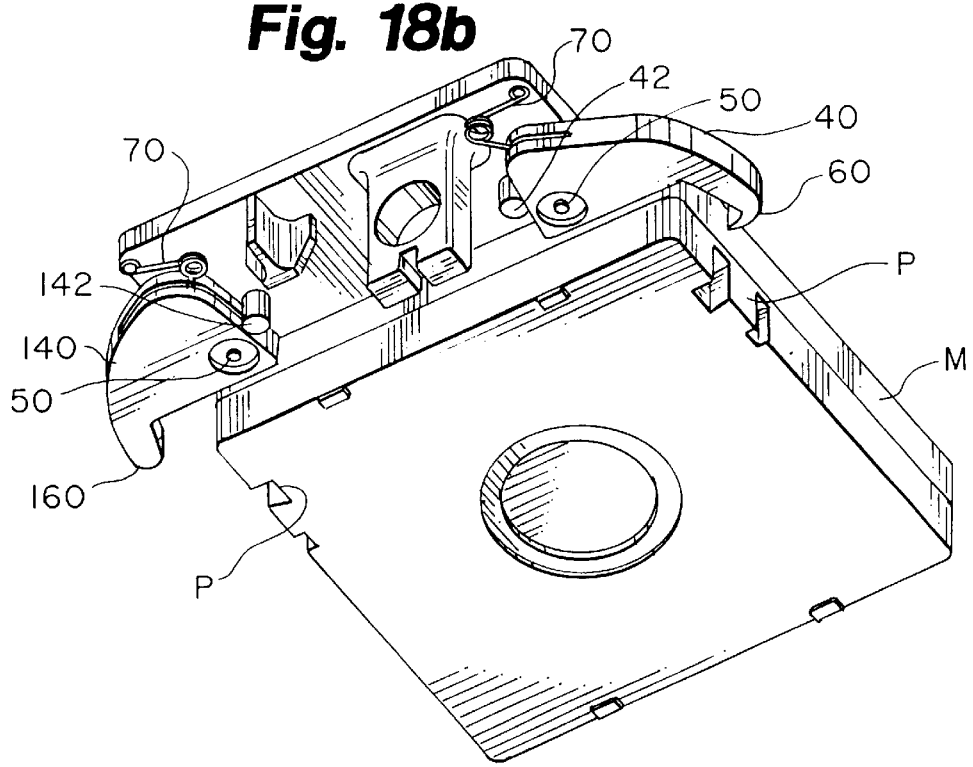

FIGS. 17a and 18a show the first embodiment with both of the picker members 40, 140 retracted from DLT media. FIGS. 17b and 18b show the first embodiment with both of the picker members 40, 140 retracted from LTO media.

Motion of the picker members 40, 140 is constrained by a post 42, 142 that prevents the picker members 40, 140 from moving too far outwardly or inwardly.

In a second embodiment (FIGS. 19a and 19b), the second picker member 140 has a latching portion 160 that includes a friction pad 162 that engages the media, acting somewhat like the latch portion 60 of the first picker member, but without engaging a pick feature on the media.

Figure 20:
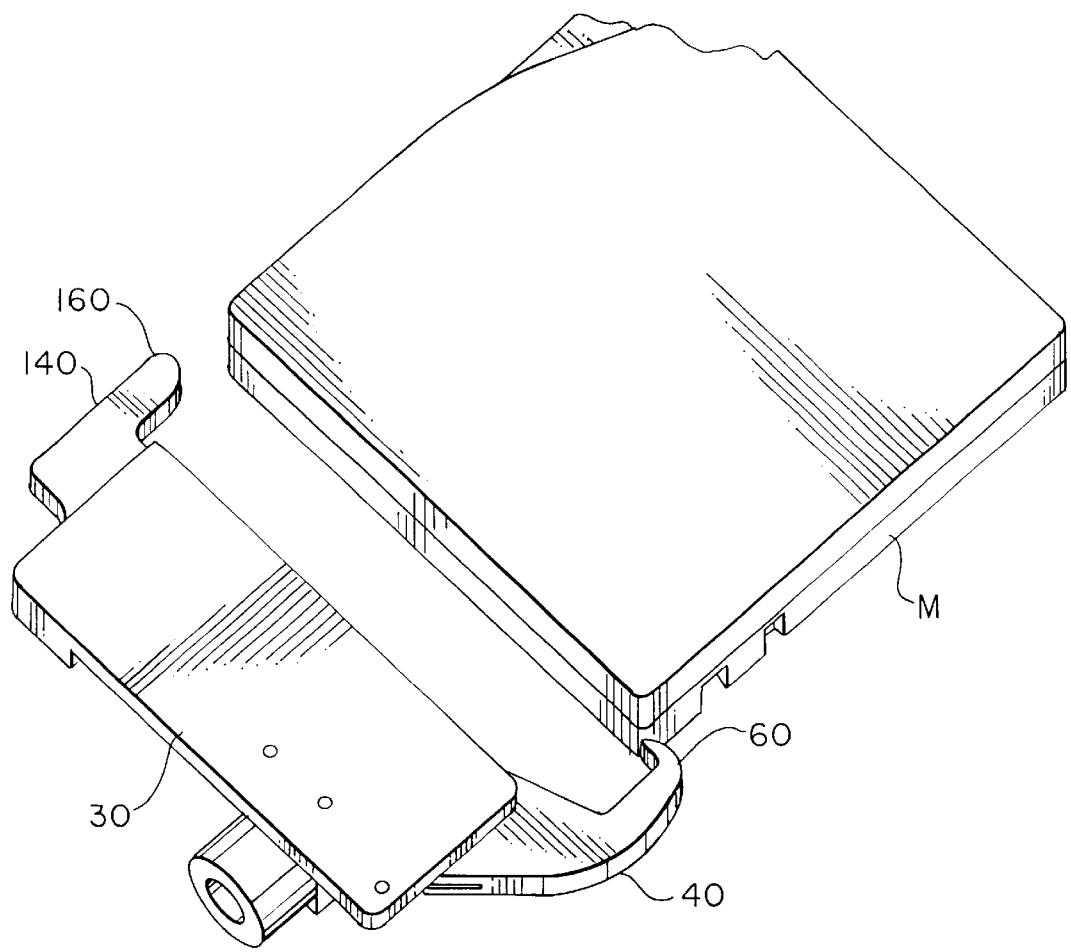
FIG. 20 is a top perspective view of an embodiment of the present invention having a non-pivoting second picker member as the picker members are approaching the media.
Figure 21:
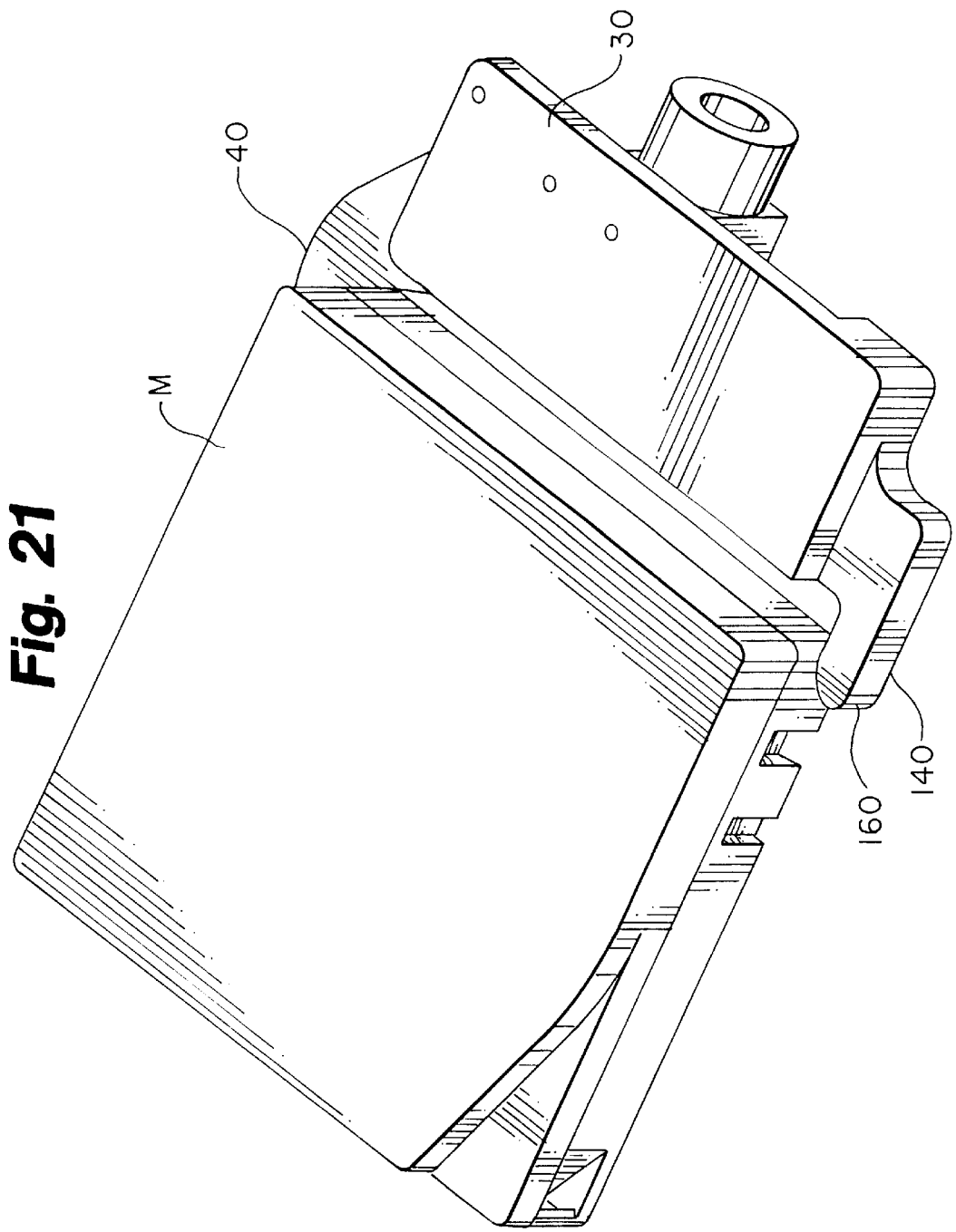
FIG. 21 is similar to FIG. 20, but shows the picker members engaging the media.
Figure 22:
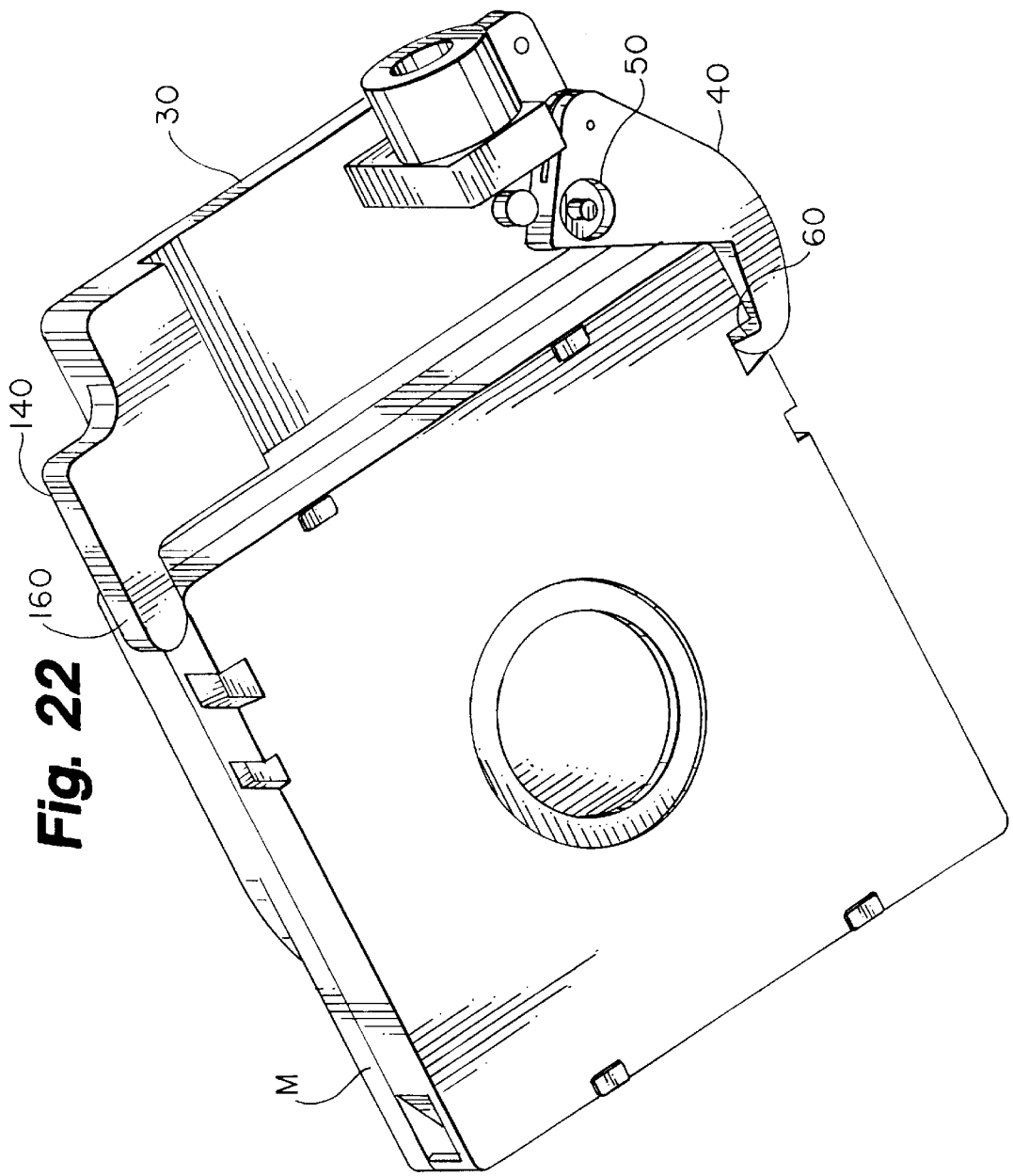
FIG. 22 is similar to FIG. 21, but is a bottom perspective view.

Alternatively, the second picker member 140 may be non-pivotally attached to the carriage 30. Because there is no second pick feature on DLT media, the second picker member may not be required to pivot toward and away from the media, but may simply slidingly engage the media as the carriage 30 moves toward the media. (FIGS. 20–22).

Figure 23:
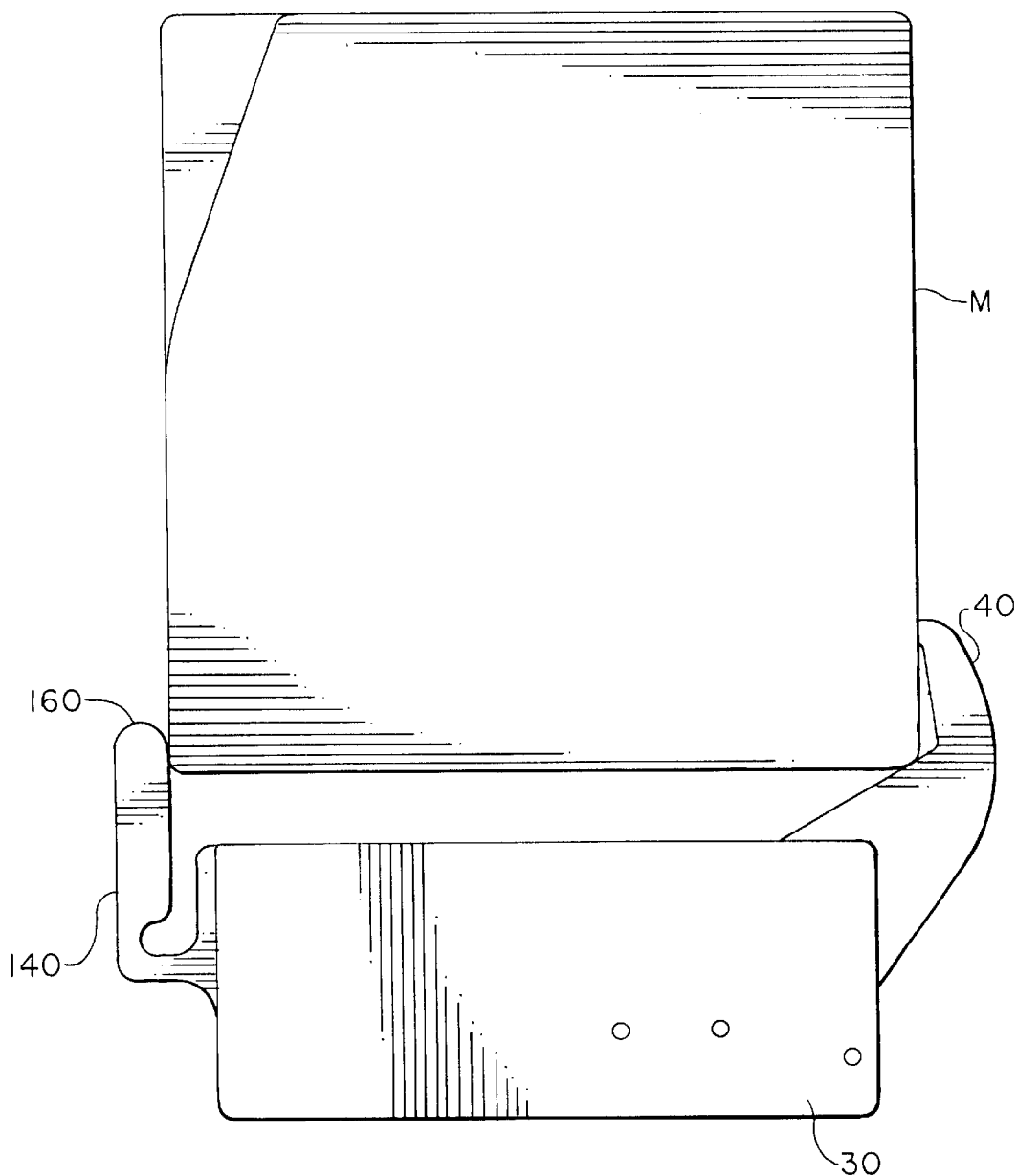
FIG. 23 is a top plan view of an embodiment of the present invention having a non-pivoting, flexible second picker member engaging the media.

In another alternative, the second picker member 140 may be non-pivotally attached to the carriage 30 and may also be flexible, so that it deflects slightly as it slidingly engages the media as the carriage 30 moves toward the media. (FIG. 23).

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for picking and placing media supported in stores and drives of a data storage library without electrical actuation or separate mechanical actuation means of grasping and releasing the media's pick feature, the apparatus comprising:

(a) a carriage movable toward and away from the media, the media being supported in the stores and drives;

(b) at least one picker member pivotally attached to the carriage at a pivot point and having a latching portion adapted to engage the media's pick feature, the picker member being movable between an open state wherein the latching portion is spaced from the media's pick feature and a closed state wherein the latching portion engages the media's pick feature; and a spring means alternately orientable between a first orientation wherein the spring means biases the picker member toward the media and a second orientation wherein the spring means biases the picker member away from the media; wherein (c) the movement of the picker member between the closed state and the open state is caused by movement of the picker member against the media supported in the stores and drives without any electrical or separate mechanical actuation means cooperating with the picker member, and wherein movement of the picker member between the open state and the closed state is caused by retraction of the carriage.

2. The apparatus of claim 1, the carriage having a central axis, wherein the media's pick feature includes a notch and a curved surface adjacent the notch and the latching portion further comprises a first ramping surface adapted to engage the curved surface, the first ramping surface sloping inwardly from the latching portion towards the central axis, forming a first acute interior angle with the central axis, whereby movement of the carriage toward the media supported in a store or drive causes the latching portion to be forced outwardly along the curved surface of the media's pick feature to an intermediate position adjacent the notch.

3. The apparatus of claim 2, wherein further movement of the carriage towards the media supported in a store or drive causes the latching portion to move from the intermediate position into the notch.

4. The apparatus of claim 3, the picker member further comprising a second ramping surface between the latching portion and the carriage, the second ramping surface sloping inwardly from the latching portion towards the central axis and forming a second acute interior angle with the central axis, whereby further movement of the carriage toward the media supported in a store or drive causes the latching portion to be forced outwardly from the notch along the curved surface of the media's pick feature.

5. The apparatus of claim 1, wherein the spring means further comprises an extension spring with a first end attached to the carriage at a first attachment point and a second end attached to the picker member at a second attachment point, wherein the pivot point is between the first attachment point and the second attachment point, and wherein in the first orientation the extension spring lies substantially inwardly of the pivot point, and wherein in the second orientation, the extension spring lies substantially outwardly of the pivot point.

6. The apparatus of claim 5, wherein the movement of the extension spring over the pivot point produces a toggling means that toggles the picker member in the closed state and the open state.

7. The apparatus of claim 1, wherein the spring means further comprises a torsion spring with a first end attached to the carriage at a first attachment point and a second end.

8. The apparatus of claim 7, wherein the apparatus further comprises a camming surface on the picker member, the pivot point of the picker member being between the latching portion and the camming surface, and a pivoting arm attached to the carriage, the second end of the torsion spring being attached to the pivoting arm, and the pivoting arm having a roller contacting the camming surface, wherein the torsion spring biases the roller against the camming surface.

9. The apparatus of claim 8, wherein the picker member has a central axis and wherein the camming surface has a first detent surface inward of the central axis and a second detent surface outward of the central axis, whereby the roller moves from the first detent surface to the second detent surface as the latching portion is deflected outwardly, and wherein the torsion spring and roller bias the picker member outwardly when the roller contacts the second detent surface.

10. The apparatus of claim 9, wherein the camming surface is smoothly curved, having a central portion extending away from the pivot point at the central axis and wherein the first detent surface and second detent surface are on opposite sides of the central portion, whereby the roller moves from the first detent surface to the second detent surface over the central portion as the latching portion is deflected outwardly.

11. The apparatus of claim 1, further comprising a second picker member pivotally attached to the carriage at a second pivot point and having a latching a portion adapted to engage the media, the second picker member being movable between an open state wherein the latching portion is spaced from the media and a closed state wherein the latching portion engages the media; and a second spring means alternately orientable between a first orientation wherein the spring means biases the second picker member toward the media and a second orientation wherein the spring means biases the second picker member away from the media, wherein the movement of the second picker member between the closed state and the open state is caused by movement of the second picker member against the media supported in the stores and drives without any electrical or separate mechanical actuation means cooperating with the second picker member.

12. The apparatus of claim 11, the carriage having a central axis, wherein the media has a second pick feature that includes a notch and a curved surface adjacent the notch and the latching portion of the second picker member further comprises a first ramping surface adapted to engage the curved surface, the first ramping surface sloping inwardly from the latching portion towards the central axis, forming a first acute interior angle with the central axis, whereby movement of the carriage toward the media supported in a store or drive causes the latching portion to be forced outwardly along the curved surface of the media's second pick feature to an intermediate position adjacent the notch.

13. The apparatus of claim 12, wherein further movement of the carriage towards the media supported in a store or drive causes the latching portion of the second picker member to move from the intermediate position into the notch.

14. The apparatus of claim 13, the second picker member further comprising a second ramping surface between the latching portion and the carriage, the second ramping surface sloping inwardly from the latching portion towards the central axis and forming a second acute interior angle with the central axis, whereby further movement of the carriage toward the media supported in a store or drive causes the latching portion of the second picker member to be forced outwardly from the notch along the curved surface of the media's second pick feature.

15. The apparatus of claim 11, wherein the spring means further comprises an extension spring with a first end attached to the carriage at a first attachment point and a second end attached to the second picker member at a second attachment point, wherein the pivot point is between the first attachment point and the second attachment point, and wherein in the first orientation the extension spring lies substantially inwardly of the pivot point, and wherein in the second orientation, the extension spring lies substantially outwardly of the pivot point.

16. The apparatus of claim 15, wherein the movement of the extension spring over the pivot point produces a toggling means that toggles the second picker member in the closed state and the open state.

17. The apparatus of claim 11, wherein the spring means further comprises a torsion spring with a first end attached to the carriage at a first attachment point and a second end.

18. The apparatus of claim 17, wherein the apparatus further comprises a camming surface on the second picker member, the pivot point of the second picker member being between the latching portion and the camming surface, and a pivoting arm attached to the carriage, the second end of the torsion spring being attached to the pivoting arm, and the pivoting arm having a roller contacting the camming surface, wherein the torsion spring biases the roller against the camming surface.

19. The apparatus of claim 18, wherein the second picker member has a central axis and wherein the camming surface has a first detent surface inward of the central axis and a second detent surface outward of the central axis, whereby the roller moves from the first detent surface to the second detent surface as the latching portion is deflected outwardly, and wherein the torsion spring and roller bias the second picker member outwardly when the roller contacts the second detent surface.

20. The apparatus of claim 19, wherein the camming surface is smoothly curved, having a central portion extending away from the pivot point at the central axis and wherein the first detent surface and second detent surface are on opposite sides of the central portion, whereby the roller moves from the first detent surface to the second detent surface over the central portion as the latching portion is deflected outwardly.

21. The apparatus of claim 7, wherein the torsion spring's second end is attached to the picker member at a second attachment point, wherein the second attachment point is between the first attachment point and the pivot point, wherein in the first orientation a line between the first attachment point and the second attachment point lies substantially outward of the pivot point, and wherein in the second orientation a line between the first attachment point and the second attachment point lies substantially inward of the pivot point.

22. The apparatus of claim 21, further comprising a curved slot on the carriage, the second attachment point being a post moving within the curved slot, thereby constraining the latching portion from moving too far inwardly and outwardly.

23. The apparatus of claim 11, further comprising a friction pad on the latching portion of the second picker member.

24. The apparatus of claim 1, further comprising a second picker member non-pivotally attached to the carriage.

25. The apparatus of claim 1, further comprising a flexible second picker member non-pivotally attached to the carriage.

* * * * *